(12) United States Patent
Kulchytskyy et al.

(10) Patent No.: US 10,802,817 B1
(45) Date of Patent: *Oct. 13, 2020

(54) PERIPHERAL DEVICE FIRMWARE UPDATE USING REST OVER IPMI INTERFACE FIRMWARE SHELL UTILITY

(71) Applicant: AMERICAN MEGATRENDS INTERNATIONAL, LLC, Norcross, GA (US)

(72) Inventors: Igor Kulchytskyy, Lawrenceville, GA (US); Chandrasekar Rathineswaran, Cumming, GA (US); Harikrishna Doppalapudi, Norcross, GA (US); Purandhar Nallagatla, Johns Creek, GA (US); Madhan B. Santharam, Cumming, GA (US)

(73) Assignee: American Megatrends International, LLC, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,569

(22) Filed: Aug. 30, 2019

Related U.S. Application Data

(63) Continuation of application No. 15/893,557, filed on Feb. 9, 2018, now Pat. No. 10,416,988.

(51) Int. Cl.
  *G06F 8/65* (2018.01)
  *G06F 13/36* (2006.01)
  (Continued)

(52) U.S. Cl.
  CPC .............. *G06F 8/65* (2013.01); *G06F 13/36* (2013.01); *G06F 21/572* (2013.01);
  (Continued)

(58) Field of Classification Search
  USPC ........................................ 717/168
  See application file for complete search history.

(56) References Cited

U.S. PATENT DOCUMENTS 6,625,729 B1 9/2003 Angelo
6,665,731 B1 12/2003 Kumar et al.
(Continued)

OTHER PUBLICATIONS

Hojati et al.; "Benchmarking Automated Hardware Management Technologies for Modern Data Centers and Cloud Environments"; UCC 2017—Proceedings of the 10th International Conference on Utility and Cloud Computing (pp. 193-194); Dec. 5, 2017 (Year: 2017).*

(Continued)

*Primary Examiner* — Wei Y Zhen
*Assistant Examiner* — Clint Thatcher
(74) *Attorney, Agent, or Firm* — Newport IP, LLC; Leonard J. Hope

(57) ABSTRACT

Technologies are described herein for a representational state transfer ("REST" or "RESTful") over IPMI interface for firmware to BMC communication and applications thereof. These applications include, but are not limited to, remote firmware configuration, firmware updates, peripheral device firmware updates, provision of management information such as system inventory data, cloning and batch migration of firmware configuration settings, and firmware integrity monitoring. This functionality can be provided in a way that enables communication between BMCs and firmware to utilize modern manageability interfaces while maintaining backward compatibility with previous IPMI implementations.

20 Claims, 22 Drawing Sheets

(51) Int. Cl.
*G06F 21/57* (2013.01)
*G06F 9/4401* (2018.01)

(52) U.S. Cl.
CPC .......... *G06F 9/4401* (2013.01); *G06F 21/575* (2013.01); *G06F 2221/034* (2013.01)

(56) References Cited

U.S. PATENT DOCUMENTS

| | | | |
|---|---|---|---|
| 7,269,534 | B2 | 9/2007 | Mugunda et al. |
| 7,849,454 | B2 | 12/2010 | Lambert et al. |
| 7,966,441 | B2 | 1/2011 | Huang |
| 8,214,653 | B1 | 7/2012 | Marr et al. |
| 8,499,094 | B2 | 7/2013 | Coile |
| 8,935,509 | B2 | 1/2015 | Chen et al. |
| 9,182,998 | B2 | 11/2015 | Inbaraj |
| 9,298,524 | B2* | 3/2016 | Lewis ................ G06F 11/0706 |
| 9,930,051 | B1 | 3/2018 | Potlapally et al. |
| 10,051,041 | B2 | 8/2018 | Reddy et al. |
| 10,114,653 | B2 | 10/2018 | Bower, III et al. |
| 10,127,032 | B2* | 11/2018 | Su .......................... G06F 8/66 |
| 10,346,187 | B1* | 7/2019 | Trier ....................... G06F 8/654 |
| 10,409,584 | B1 | 9/2019 | Kulchytskyy et al. |
| 10,416,988 | B1 | 9/2019 | Kulchytskyy et al. |
| 10,489,142 | B1 | 11/2019 | Podgorsky et al. |
| 2004/0228063 | A1 | 11/2004 | Hawkins et al. |
| 2005/0038808 | A1 | 2/2005 | Kutch |
| 2007/0169088 | A1 | 7/2007 | Lambert et al. |
| 2008/0046546 | A1 | 2/2008 | Parmar et al. |
| 2014/0195669 | A1 | 7/2014 | Bhatia et al. |
| 2014/0195711 | A1 | 7/2014 | Bhatia et al. |
| 2014/0324944 | A1 | 10/2014 | Christopher et al. |
| 2014/0344430 | A1 | 11/2014 | Ayanam et al. |
| 2015/0081829 | A1 | 3/2015 | Maity et al. |
| 2015/0149684 | A1 | 5/2015 | Dhandapani |
| 2015/0149815 | A1 | 5/2015 | Maity et al. |
| 2015/0160627 | A1 | 6/2015 | Maddukuri et al. |
| 2015/0169330 | A1 | 6/2015 | Maity et al. |
| 2015/0178096 | A1 | 6/2015 | Inbaraj |
| 2015/0317148 | A1 | 11/2015 | Ohashi |
| 2016/0006620 | A1 | 1/2016 | Maity et al. |
| 2016/0014073 | A1 | 1/2016 | Reddy et al. |
| 2016/0140184 | A1 | 5/2016 | Deissner et al. |
| 2016/0147540 | A1 | 5/2016 | Chiu et al. |
| 2017/0046152 | A1 | 2/2017 | Shih et al. |
| 2017/0054603 | A1 | 2/2017 | Kulkarni et al. |
| 2017/0085413 | A1 | 3/2017 | Cencini et al. |
| 2017/0085637 | A1 | 3/2017 | Cencini et al. |
| 2017/0116103 | A1 | 4/2017 | Cencini et al. |
| 2017/0123927 | A1 | 5/2017 | Su |
| 2017/0126505 | A1 | 5/2017 | Cencini et al. |
| 2017/0131753 | A1 | 5/2017 | Ahmed et al. |
| 2017/0149880 | A1 | 5/2017 | Lochhead et al. |
| 2017/0149931 | A1 | 5/2017 | Lochhead et al. |
| 2017/0264493 | A1 | 9/2017 | Cencini et al. |
| 2017/0329483 | A1 | 11/2017 | Jann et al. |
| 2017/0357515 | A1 | 12/2017 | Bower, III et al. |
| 2017/0371756 | A1 | 12/2017 | Hanson et al. |
| 2018/0026835 | A1 | 1/2018 | Nachimuthu et al. |
| 2018/0088851 | A1 | 3/2018 | Duisenberg et al. |
| 2018/0101376 | A1 | 4/2018 | Olarig et al. |
| 2018/0121656 | A1 | 5/2018 | Scherer, III et al. |
| 2018/0136946 | A1 | 5/2018 | El-Haj-Mahmoud et al. |
| 2018/0157532 | A1 | 6/2018 | Kumar et al. |
| 2018/0173516 | A1 | 6/2018 | Tung |
| 2018/0210724 | A1 | 7/2018 | Su |
| 2018/0219877 | A1 | 8/2018 | Hsu et al. |
| 2018/0248749 | A1 | 8/2018 | Chou et al. |
| 2018/0314507 | A1 | 11/2018 | Chien |
| 2018/0322012 | A1 | 11/2018 | Sharma et al. |
| 2018/0357108 | A1 | 12/2018 | Mullander et al. |
| 2019/0050351 | A1 | 2/2019 | Sahu et al. |
| 2019/0087182 | A1 | 3/2019 | Thomas |
| 2019/0095195 | A1* | 3/2019 | Lin ....................... G06F 9/4406 |

OTHER PUBLICATIONS

U.S. Appl. No. 15/893,503—Non Final Office Action, dated Dec. 18, 2019, 32 pages.
Web article: Autor, Jeff, "Introduction to Redfish", published May 2015 by DMTF [online][retrieved on Dec. 31, 2018] retrieved from: https://www.dmtf.org/sites/default/files/Introduction_to_Redfish_2015.pdf, 13 pp.
Web article: Frommel, Oliver, "Redfish standard as a replacement for IPMI Chassis Management", published 2017 [online][retrieved on Dec. 31, 2018] retrieved from: https://www.admin-magazine.com/Archive/2017/38/Redfish-standard-as-a-replacement-for-IPMI-Chassis-Management, 4 pp.
Web article: Lee, Joel, "How to Make an 'EXE' Installation File", published May 17, 2017 [online][retrieved on Dec. 31, 2018] retrieved from: https://www.makeuseof.com/tag/how-to-make-an-exe-installation-file, 5 pp.
Web document: Redfish Host Interface Specification, publisher: Distributed Management Task Force, Inc., Portland, OR © 2017 [online][retrieved on Jan. 4, 2018] retrieved from: https://www.dmft.org/sites/default/files/standards/documents/DSP0270-1.0.0.pdf, 19 pps.
Web document: Regenscheid, A. BIOS Protection Guidelines for Servers, NIST Special Publication 800-147B, Aug. 2014, 32 pp., [retrieved on May 2, 2019] retrieved from Internet.
Web Document: Zhang, F., "A Framework to Secure Peripherals at Runtime," ESORICS 2014, European Symposium on Research in Computer Security (ESORICS), 2014, pp. 219-238, [retrieved on May 2, 2019] retrieved from Internet.
Web Article—AptioV Megarec, AMI Remote Firmware Management, published 2017 [retrieved on: Sep. 9, 2019] [retrieved from: https://ami.com/ami_downloads/AMI_Remote_Firmware_Management_Data_Sheet.pdf], 2 pp.
Web Article—Stirbu, Vlad, "A RESTful Architecture for Adaptive and Multi-device Application Sharing," Published by Nokia Research Center, 2010, [retrieved on Sep. 9, 2019][retrieved from: https://dl.acm.org/citation.cfm?id=1798388>] 4 pp.
Non-Final Office action for U.S. Appl. No. 15/893,503, dated Jan. 2, 2019, Kulchytskyy et al., "REST Over IPMI Interface for Firmware to BMC Communication", 24 pp.
Final Office action for U.S. Appl. No. 15/893,503, dated Jul. 19, 2019, Kulchytskyy et al., "REST Over IPMI Interface for Firmware to BMC Communication", 24 pp.
Non Final Office Action for U.S. Appl. No. 15/893,521, dated Aug. 1, 2019, Santharam et al., "Firmware Configuration Using REST Over IPMI Interface", 13 pp.
Non-Final Office action for U.S. Appl. No. 15/893,534, dated Jan. 10, 2019, Santharam et al., "Firmware Update Using REST Over IPMI Interface", 18 pp.
Non-Final Office action for U.S. Appl. No. 15/893,534, dated Apr. 29, 2019, Santharam et al., "Firmware Update Using REST Over IPMI Interface", 21 pp.
Notice of Allowance for U.S. Appl. No. 15/893,534, dated Sep. 18, 2019, Santharam et al., "Firmware Update Using REST Over IPMI Interface", 13 pp.
Final Office Action for U.S. Appl. No. 15/893,565, dated Aug. 1, 2019, Kulchytskyy et al., "Cloning of Firmware Configuration Settings Using REST Over IPMI Interface", 10 pp.
U.S. Appl. No. 15/893,503, filed Feb. 9, 2018, "REST Over IPMI Interface for Firmware to BMC Communication" first named inventor: Igor Kulchytskyy, 82 pps.
U.S. Appl. No. 15/893,544, filed Feb. 9, 2018, "Obtaining System Inventory Data Using REST Over IPMI Interface" first named inventor: Igor Kulchytskyy, 82 pps.
U.S. Appl. No. 15/893,534, filed Feb. 9, 2018, "Firmware Update Using REST Over IPMI Interface" first named inventor Madhan B. Santharam, 81 pps.
U.S. Appl. No. 15/893,565, filed Feb. 9, 2018, "Cloning of Firmware Configuration Settings Using REST Over IPMI Interface" first named inventor: Igor Kulchytskyy, 82 pps.
U.S. Appl. No. 16/556,495, filed Aug. 30, 2019, "Peripheral Device Firmware Update Using REST Over IPMI Interface Firmware Update Module" first named inventor: Igor Kulchytskyy, 83 pp.

(56) References Cited

OTHER PUBLICATIONS

U.S. Appl. No. 16/565,370, filed Sep. 9, 2019, "Secure Firmware Integrity Monitoring Using REST Over IPMI Interface Firmware Shell Utility" first named inventor: Oleksandr Podgorsky, 82 pp.
U.S. Appl. No. 15/893,544—Non Final Office Action, dated Feb. 10, 2020, 93 pages.
U.S. Appl. No. 15/893,544—Final Office Action, dated May 22, 2020, 32 pages.
U.S. Appl. No. 16/565,370—Non-Final Office Action, dated Jul. 24, 2020, 32 pages.

* cited by examiner

FIRMWARE UPDATE USING REST OVER IPMI INTERFACE

PERIPHERAL DEVICE FIRMWARE UPDATE USING REST OVER IPMI INTERFACE FIRMWARE SHELL UTILITY

CROSS-REFERENCE TO RELATED APPLICATION

This application is a continuation of U.S. patent application Ser. No. 15/893,557, filed Feb. 9, 2018, the content of which application is expressly incorporated herein by reference in its entirety.

BACKGROUND

Scalability in today's data center is increasingly achieved with horizontal, scale-out solutions, which often include large quantities of simple servers. The usage model of scale-out hardware is, however, drastically different than that of traditional enterprise platforms and, therefore, requires a new approach to platform management.

In order to enable platform management in large server installations such as those described above, managed computer systems commonly include a baseboard management controller ("BMC"). A BMC is a specialized service processor that monitors the physical state of a computer, network server or other hardware device using sensors and communicates with a system administrator through an out-of-band ("OOB") network connection.

BMCs typically communicate with the computing systems that host them using interfaces and commands defined by the Intelligent Platform Management Interface ("IPMI"). IPMI is a set of computer interface specifications for autonomous computer systems, like BMCs, that provide monitoring capabilities independently of a host system's processor, firmware, and operating system. IPMI commands are capable of transmitting only small amounts of information at a time and, therefore, are typically inappropriate for use in transmitting large amounts of data such as that utilized by modern manageability interfaces. However, IPMI commands and the associated interfaces between BMCs and host firmware must be maintained in order to ensure backward compatibility, even when modern manageability interfaces are utilized.

It is with respect to these and other considerations that the disclosure made herein is presented.

SUMMARY

Technologies are described herein for a representational state transfer ("REST" or "RESTful") over IPMI interface for firmware to BMC communication and applications thereof. These applications include, but are not limited to, remote firmware configuration, firmware updates, peripheral device firmware updates, provision of management information such as system inventory data, cloning and batch migration of firmware configuration settings, and firmware integrity monitoring. This functionality can be provided in a way that enables communication between BMCs and firmware to utilize modern manageability interfaces while maintaining backward compatibility with previous IPMI implementations. Technical benefits other than those specifically mentioned herein can also be realized through an implementation of the disclosed technologies.

Rest Over IPMI Interface

In order to provide the REST over IPMI interface described herein, a firmware driver is executed by a firmware of a computing system in one embodiment. The firmware driver obtains management data for the computing system such as, but not limited to, inventory data describing components present in the computing system. The firmware driver can, for example, obtain the management data at a boot time of the computing system.

The firmware driver generates a REST Hypertext Transfer Protocol ("HTTP") request (e.g. an HTTP POST request) that includes the management data to an interface exposed by a REST over IPMI driver, also executing in the firmware. In one embodiment, the REST HTTP request is compatible with the REDFISH management standard. REDFISH is a successor to previous manageability interfaces created by the Distributed Management Task Force ("DMTF"). REDFISH is an open industry standard specification and schema for simple, modern, and secure management of scalable platform hardware, such as server computers located in data centers. The REDFISH specification and schema specifies a REST interface, and utilizes JAVASCRIPT object notation ("JSON") and the Open Data Protocol ("OData") to integrate management solutions within existing toolchains. The management data in the REST HTTP request can be expressed using a JSON format that is based on OData.

In order to utilize the functionality provided by REDFISH, managed computer systems must include a BMC. As discussed above, a BMC is a specialized service processor that monitors the physical state of a computer, network server or other managed hardware device using sensors and communicates with a system administrator through an OOB network connection. Although the embodiments disclosed herein are described primarily as utilizing REDFISH, the REST HTTP requests 128 disclosed herein can be formatted according to other specifications in other embodiments.

In one embodiment, the REST over IPMI driver executing in the firmware receives the REST HTTP request from the firmware driver. In response thereto, the REST over IPMI driver generates an original equipment manufacturer ("OEM") IPMI command that encapsulates the REST HTTP request. The REST over IPMI driver then provides the OEM IPMI command to the BMC of the computing system over a REST over IPMI interface.

In one embodiment, the BMC includes an IPMI agent that receives the OEM IPMI command from the REST over IPMI driver executing in the firmware of the computing system. In response thereto, the IPMI agent retrieves the REST HTTP request from the OEM IPMI command, and provides the REST HTTP request to an interface exposed by a management server executing in the BMC. In one embodiment, the interface provided by the management server is implemented as a REDFISH-compatible REST interface provided over secure HTTPS that utilizes a JSON format that is based on OData. The management server stores the management data in an appropriate data store in the BMC.

The management server also generates a REST HTTP response to the REST HTTP request such as, for example, a response including data indicating that the REST HTTP request was successful. The management server provides the REST HTTP response to an interface exposed by the IPMI agent executing in the BMC. The IPMI agent, in turn, receives the REST HTTP response from the management server and generates an OEM IPMI response that includes the REST HTTP response. The IPMI agent then provides the OEM IPMI response that includes the REST HTTP response to the REST over IPMI driver executing in the firmware.

The IPMI driver receives the OEM IPMI response that includes the REST HTTP response from the IPMI agent. The REST over IPMI driver then extracts the REST HTTP response from the OEM IPMI response received from the IPMI agent. The REST over IPMI driver then provides the REST HTTP response to an interface exposed by the firmware driver. In this manner, OEM IPMI commands can be utilized to encapsulate RESTful HTTP requests and responses and, thereby, provide a REST over IPMI interface for enabling communication between a firmware and a BMC.

In some embodiments, the management server also exposes an interface, such as a REDFISH interface, through which management clients can request the management data. In response to receiving such a request, the management server can retrieve the requested management data from the data store in the BMC and provide the requested management data to the management client. The interface can be provided over an OOB network connection, for example.

Firmware Configuration Using Rest Over IPMI Interface

The REST over IPMI interface described above is utilized in one embodiment to remotely configure a firmware. In order to provide this functionality, the firmware driver executing in the firmware of a managed computing system transmits a REST HTTP request that includes data for generating a remote firmware setup user interface ("UP") to a BMC over a REST over IPMI interface, such as that described above. The data can include, for instance, an attribute registry and remote firmware setup UI resources. The data can also include current firmware configuration settings for the managed computing system. The data for generating the remote firmware setup UI can be transmitted from the firmware to the BMC using multiple OEM IPMI commands containing REST HTTP requests.

The management server executing in the BMC receives the data and utilizes the data to generate a remote firmware setup UI for use by remote management clients. For example, and without limitation, the remote firmware setup UI can be utilized to submit new configuration settings for the firmware. The management server can receive the new configuration settings from the management client and transmit the new configuration settings to the firmware over the REST over IPMI interface.

The firmware driver can receive the new configuration settings and configure the firmware with the new configuration settings. For example, the firmware driver can request the new firmware configuration settings from the BMC following a reboot of the managed computing system. In turn, the BMC can transmit the new configuration settings to the firmware over the REST over IPMI interface following the reboot. The computing system can then be configured with the new firmware configuration settings following another reboot of the managed computing system.

Firmware Update Using Rest Over IPMI Interface

The REST over IPMI interface described above is utilized in one embodiment to remotely update a firmware. In order to provide this functionality, the firmware driver transmits a request for a firmware update instruction from the firmware to a BMC over a REST over IPMI interface, such as that described above. In response to receiving the firmware update instruction, the BMC provides data identifying a location of a firmware image to the firmware driver, also over the REST over IPMI interface.

In turn, the firmware driver retrieves the firmware image from the location of the firmware image identified by the data provided by the BMC. The firmware driver then updates the firmware of the computing system using the firmware image. The firmware driver can also send data describing the success or failure of the updating of the firmware to the BMC.

In one embodiment, the BMC transmits the data identifying the location of the firmware image by placing non-standard data (i.e. the location of the firmware image) stored in a standard property, such as a REDFISH property. The standard IPMI property might, for example, be a property for identifying a location of a boot device of the managed computing system. The firmware update instruction and firmware update options can also be provided from the BMC to the firmware by placing non-standard data in a standard REDFISH property.

As in the embodiments described above, the request for the firmware update instruction can be transmitted from the firmware driver to the BMC using OEMI IPMI commands containing REST HTTP requests. As also in the embodiments described above, the request for the firmware update instruction can be expressed using a JSON format based on OData.

The BMC can also transmit the data identifying the location of the firmware image to the firmware driver using OEM IPMI responses containing HTTP REST responses. The data identifying the location of the firmware image can also be expressed using a JSON format based on OData. Similarly, the data describing the success or failure of the updating of the firmware can also be expressed using a JSON format based on OData.

Peripheral Device Firmware Update Using Rest Over IPMI Interface (Firmware Update Module)

The REST over IPMI interface described above is utilized in one embodiment to remotely update a firmware of a peripheral device connected to a managed computing system using a firmware update module. For example, the disclosed mechanism can be utilized to update a peripheral component interconnect express ("PCIe") firmware of a PCIe device or a firmware in another type of peripheral device using a firmware update module.

In order to update the firmware of a peripheral device using a firmware update module, a firmware driver executing in the firmware of the managed computing system transmits a request for a firmware update instruction for a peripheral device to a BMC over the REST over IPMI interface described above. The BMC receives the request and, in response to the request, provides data to the firmware driver identifying a location of a peripheral device firmware image for the peripheral device over the REST over IPMI interface.

The firmware driver then utilizes the data provided by the BMC to retrieve the peripheral device firmware image from the specified location. In some embodiments the BMC provides the peripheral device firmware image to the firmware. Once the peripheral device firmware image has been retrieved, a firmware update module executing in the firmware updates the firmware of the peripheral device using the peripheral device firmware image.

As in the embodiment described above, the data identifying the location of the peripheral device firmware image and the firmware update instruction for the peripheral device can be generated by placing non-standard data in a standard REDFISH property. The standard REDFISH property might, for example, be a property for identifying a location of a boot device of the managed computing system. Similarly, the data identifying the location of the peripheral device firmware image can be transmitted from the BMC to the firmware driver using OEMI IPMI commands containing REST HTTP requests. As also in the embodiments described above, the data identifying the location of the peripheral device firmware image can be expressed using a JSON format based on OData.

Peripheral Device Firmware Update Using Rest Over IPMI Interface (Firmware Shell Utility)

The REST over IPMI interface described above is utilized in one embodiment to remotely update a firmware using a firmware shell utility. For example, the disclosed mechanism can be utilized to update a PCIe firmware of a PCIe device or a firmware in another type of peripheral device using a firmware shell utility.

In order to update the firmware of a peripheral device using a firmware shell utility, a firmware driver executing in the firmware of the managed computing system transmits a request for a firmware update instruction for a peripheral device to a BMC over the REST over IPMI interface described above. The BMC receives the request and, in response to the request, provides data to the firmware driver identifying the location of a peripheral device firmware image for the peripheral device over the REST over IPMI interface. In this embodiment, the firmware image includes a firmware script, a firmware shell utility, and an updated peripheral device firmware.

The firmware driver then utilizes the data provided by the BMC to retrieve the peripheral device firmware image from the specified location. In some embodiments the BMC provides the peripheral device firmware image to the firmware driver. Once the peripheral device firmware image has been retrieved, the firmware script is executed in a shell environment provided by the firmware of the computing system. When executed, the firmware script executes the firmware shell utility in the shell environment. The firmware shell utility updates the firmware of the peripheral device using the updated peripheral device firmware.

As in the embodiments described above, the data identifying the location of the peripheral device firmware image can be generated by placing non-standard data in a standard REDFISH property. The standard REDFISH property might, for example, be a property for identifying a location of a boot device of the managed computing system. Similarly, the data identifying the location of the peripheral device firmware image can be transmitted from the BMC to the firmware driver using OEMI IPMI commands containing REST HTTP requests. As also in the embodiments described above, the data identifying the location of the peripheral device firmware image can be expressed using a JSON format based on OData.

Obtaining System Inventory Data Using Rest Over IPMI Interface

The REST over IPMI interface described above is utilized in one embodiment to provide system inventory data from a firmware to a BMC. In this embodiment, a firmware driver is executed by a firmware of a managed computing system. The firmware driver obtains system inventory data describing components of the computing system. The firmware driver can, for example, obtain the system inventory data at a boot time of the computing system.

The firmware driver generates a REST HTTP request (e.g. an HTTP POST request) that includes the system inventory data to an interface exposed by a REST over IPMI driver, also executing in the firmware. The REST over IPMI driver receives the REST HTTP request including the system inventory data from the firmware driver. In response thereto, the REST over IPMI driver generates an OEM IPMI command that encapsulates the REST HTTP request. The REST over IPMI driver then provides the OEM IPMI command to the BMC of the computing system over a REST over IPMI interface.

In this embodiment, the BMC includes an IPMI agent that receives the OEM IPMI command from the REST over IPMI driver executing in the firmware of the computing system. In response thereto, the IPMI agent retrieves the REST HTTP request from the OEM IPMI command and provides the REST HTTP request to an interface exposed by a management server executing in the BMC. As discussed above, the interface provided by the management server can be implemented as a REDFISH-compatible REST interface provided over secure HTTPS that utilizes a JSON format that is based on OData in some embodiments disclosed herein. The management server stores the system inventory data in an appropriate data store in the BMC.

The management server also generates a REST HTTP response to the REST HTTP request such as, for example, a response including data indicating that the REST HTTP request was successful. The management server provides the REST HTTP response to an interface exposed by the IPMI agent executing in the BMC. The IPMI agent, in turn, receives the REST HTTP response from the management server and generates an OEM IPMI response that includes the REST HTTP response. The IPMI agent then provides the OEM IPMI response that includes the REST HTTP response to the REST over IPMI driver.

The IPMI driver receives the OEM IPMI response that includes the REST HTTP response from the IPMI agent. The REST over IPMI driver then extracts the REST HTTP response from the OEM IPMI response received from the IPMI agent. The REST over IPMI driver then provides the REST HTTP response to an interface exposed by the firmware driver. In this manner, OEM IPMI commands can be utilized to encapsulate RESTful HTTP requests including system inventory data and responses.

In some embodiments, the management server also exposes an interface, such as a REDFISH-compatible interface, through which management clients can request the system inventory data. In response to receiving such a request, the management server can retrieve the requested system inventory data from the data store, and provide the system inventory data to the management client. The interface can be provided over an OOB network connection, for example.

Cloning of Firmware Configuration Settings Using Rest Over IPMI Interface

The REST over IPMI interface described above is utilized in one embodiment to clone firmware configuration settings for remote configuration of one or more managed computing systems. In order to provide this functionality, a BMC of a first computing system, referred to herein as a "master managed computing system," obtains firmware configuration settings from a firmware of the master managed computing system utilizing a REST over IPMI interface such as that described above. As in the examples described above, the firmware configuration settings can be obtained using OEM IPMI commands containing REST HTTP requests.

The BMC of the master managed computing system provides the firmware configuration settings for the master managed computing system to a second computing system, referred to herein as a "configurator computing system." The BMC might provide the configuration settings to the configurator computing system following a reboot of the master managed computing system.

The configurator computing system then provides the firmware configuration settings to the BMCs of one or more other computing systems, referred to herein as "target managed computing systems." The BMCs of the target managed computing systems provide the firmware configuration settings to the firmware of the target managed computing systems using the REST over IPMI interface described above.

As in the examples described above, the firmware configuration settings can be obtained using OEM IPMI commands containing REST HTTP requests. The configuration settings might be provided to the firmware of the target managed computing systems following a reboot of the target managed computing systems. The firmware of the target managed computing systems replaces current firmware configuration settings with the firmware configuration settings obtained from the master managed computing system.

In some embodiments, the configurator computing system provides a UI that includes UI controls for receiving a network address of the master managed computing system and network addresses of the BMCs of the target managed computing systems. The UI can also receive credentials for use in accessing the BMCs of the target managed computing systems.

Secure Firmware Integrity Monitoring Using Rest Over IPMI Interface

The REST over IPMI interface described above is utilized in one embodiment to facilitate monitoring of the integrity of a firmware of a managed computing system. One embodiment provides a mechanism for OOB firmware integrity monitoring. Another embodiment provides a mechanism for in-band firmware integrity monitoring.

In order to implement OOB firmware integrity monitoring, a managed computing system executes a firmware root of trust at boot time. The firmware root of trust is a portion of the firmware that is executed immediately following power on of the managed computing system. The firmware root of trust cannot be modified.

The firmware root of trust computes a current hash value for another portion of the firmware (e.g. the remainder of the firmware) and provides the current hash value to the BMC of the managed computing system using the REST over IPMI interface described above. The current hash value can be computed at boot time of the managed computing system. The BMC of the managed computing system stores the current hash value in a secure storage location, such as sealed storage. The managed computing system then continues execution of the remainder of the firmware.

A management client retrieves the current hash value from a management interface (e.g. a REDFISH interface) provided by a BMC of the managed computing system. The management client also retrieves a reference hash value for the firmware from a server computer, which might be referred to herein as a "firmware release server." The reference hash value is a hash value computed at the time the firmware is built for the same portion of firmware (e.g. the portion of the firmware other than the firmware root of trust) for which the firmware root of trust computes the hash value.

The management client compares the current hash value to the reference hash value. If the current hash value and the reference hash are the same, the firmware is deemed to be valid and, therefore, no action is taken. If, however, the current hash value and the reference hash value are different, the firmware is deemed to be invalid, and the management client initiates an update of the firmware. In some embodiments, one of the mechanisms described above for updating a firmware are utilized. In other embodiments, the BMC of the managed computing system performs the firmware update directly.

In order to implement in-band firmware integrity monitoring, the managed computing system executes the firmware root of trust at boot time. The firmware root of trust computes a current hash value for another portion of the firmware (e.g. the remainder of the firmware) and provides the current hash value to the BMC of the managed computing system using the REST over IPMI interface described above. The current hash value can be computed at boot time of the managed computing system. The BMC of the managed computing system stores the current hash value in a secure storage location, such as sealed storage. The managed computing system does not, however, continue execution of the remainder of the firmware at this time. Rather, the managed computing system pauses execution of the firmware.

In this embodiment, the BMC of the managed computing system retrieves a reference hash value for the firmware from the firmware release server. In other embodiments, the BMC stores the reference hash value in sealed storage. The reference hash value can be stored in the BMC at the time the firmware is being updated.

The BMC compares the current hash value to the reference hash value. If the current hash value and the reference hash are the same, the firmware is deemed to be valid. In this case, the BMC instructs the firmware of the managed computing system to continue execution. This instruction can be provided using the REST over IPMI mechanism described above.

If, however, the current hash value and the reference hash value are different, the firmware is deemed to be invalid, and the BMC instructs the firmware of the managed computing system to halt execution, thereby preventing execution of the remainder of the firmware. The BMC can then initiate remedial action, such as updating the firmware of the managed computing system. The BMC of the managed computing system performs the firmware update directly in some embodiments.

It is to be appreciated that while the embodiments disclosed herein are primarily presented in the context of using a REST over IPMI interface for firmware to BMC communication, some of the embodiments disclosed herein can utilize other mechanisms for firmware to BMC communication. For example, and without limitation, in some of the embodiments disclosed herein, a firmware can communicate directly with the BMC over a REST transport protocol on top of any available communication protocol, such as HTTP, MCTP, etc. including the IPMI. Accordingly, the embodiments disclosed herein are not limited to use with the REST over IPMI interface disclosed herein.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for a REST over IPMI interface for enabling firmware to BMC communication and applications thereof. As discussed above, these applications include, but are not limited to, remote firmware configuration, firmware updates, peripheral device firmware updates, provision of management information such as system inventory data, cloning and batch migration of firmware configuration settings, and firmware integrity monitoring. This functionality can be provided in a way that enables communication between BMCs and firmware to utilize modern manageability interfaces while maintaining backward compatibility with previous IPMI implementations. Technical benefits other than those specifically mentioned herein can also be realized through an implementation of the disclosed technologies. Additional details regarding these aspects will be provided below with regard to FIGS. 1-19.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Rest Over IPMI Interface

Figure 1:
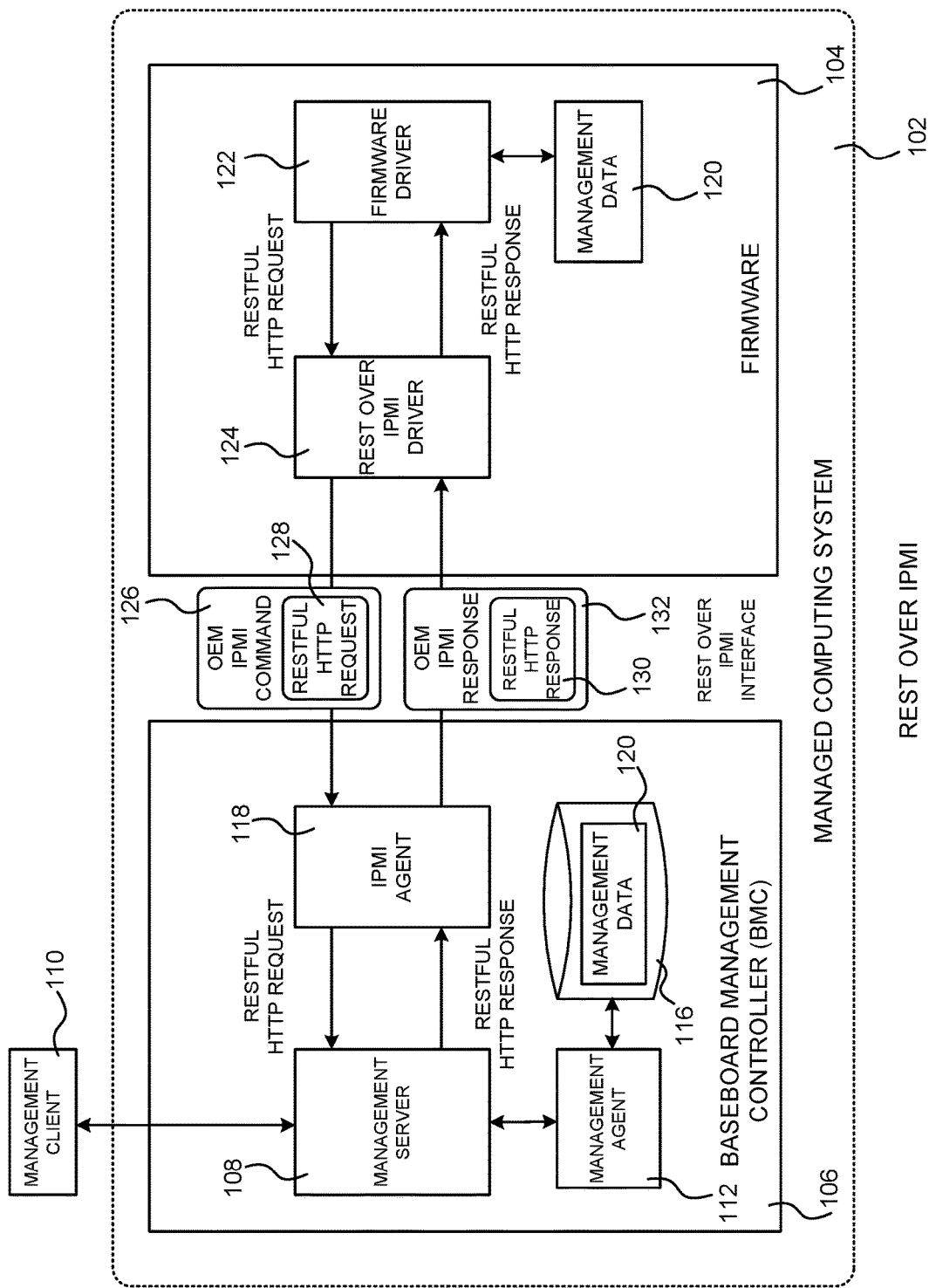
FIG. 1 is a software architecture diagram illustrating aspects of a mechanism for providing a REST over IPMI interface for firmware to BMC communication, according to one or more embodiments presented herein.

FIG. 1 is a software architecture diagram illustrating aspects of a mechanism for providing a REST over IPMI interface for enabling firmware to BMC communication, according to one or more embodiments presented herein. As mentioned above, the REST over IPMI interface can be utilized to support various types of functionality including, but not limited to, remote firmware configuration, firmware updates, peripheral device firmware updates, provision of management information such as system inventory data, cloning and batch migration of firmware configuration settings, firmware integrity monitoring, and others. Some of these applications are described in detail below.

The embodiments disclosed herein are presented in the context of a managed computing system 102 that is equipped with a BMC 106. As discussed above a BMC 106 is a specialized service processor that monitors the physical state of a computer, such as the managed computing system 102, using sensors and communicates with a system administrator through an OOB network connected to a management client 110.

In order to provide various aspects of its functionality, some of which are described herein, the BMC 106 also communicates with a firmware 104 of the managed computing system using the disclosed REST over IPMI interface. The firmware 104 can be implemented to be compliant with the Unified Extensible Firm Interface ("UEFI") Specification. Other types of firmware can be utilized in other embodiments. Additional details regarding the configuration and operation of the firmware 104 in one embodiment are provided below with regard to FIG. 18.

In one embodiment disclosed herein, the REST over IPMI interface is utilized to provide management data 120 from the firmware 104 to the BMC 106. Management data 120 includes, but is not limited to, any type of data regarding the configuration or operation of the managed computing system 102. For example, and without limitation, the management data 120 can include data describing the configuration of the firmware 104. The management data 120 can also include data describing the operational characteristics of the managed computing system 102 such as, but not limited to, the temperature of one or more components of the managed computing system 102, speed of rotational components (e.g., spindle motor, CPU fan, etc.) within the managed computing system 102, the voltage across or applied to one or more components within the managed computing system 102, and the available and/or used capacity of memory or storage devices within the managed computing system 102. As discussed in greater detail below, the management data 120 can also include inventory data describing the inventory of the managed computing system 102. The management data 120 can also describe other aspects of the configuration and operational characteristics of the managed computing system 102.

Details regarding the provision of the management data 120 from the firmware 104 to the BMC 106 utilizing a REST over IPMI interface are described with reference to FIGS. 1-3. Several other applications of the REST over IPMI interface are described below with reference to FIGS. 4-17. It is to be appreciated that the disclosed applications of the REST over IPMI interface are illustrative and that other applications can be utilized in other embodiments.

In order to provide the REST over IPMI interface shown in FIG. 1, the firmware 104 executes a firmware driver 122 in one embodiment. The firmware driver 122 is a software component that obtains the management data 120 for the managed computing system 102. The firmware driver 122 can, for example, obtain the management data 120 at a boot time of the managed computing system 102. As used herein, the term "boot time" refers to the time period after the firmware 104 begins executing and before the operating system of the managed computing system 102 starts to load.

As illustrated in FIG. 1, the firmware driver 122 generates a REST HTTP request 128 (e.g. an HTTP POST request) that includes the management data 120 sent to an interface exposed by a REST over IPMI driver 124, also executing in the firmware 104. In embodiments disclosed herein, the REST HTTP request 128 generated by the firmware driver 122 is compatible with the REDFISH management standard. The interface exposed by the REST over IPMI driver 124 is also compatible with the REDFISH management standard in these embodiments.

As discussed above, REDFISH is a successor to previous manageability interfaces created by the DMTF. REDFISH is an open industry standard specification and schema for simple, modern, and secure management of scalable platform hardware, such as server computers located in data centers. The REDFISH specification and schema specifies a REST interface, and utilizes JSON and OData to integrate management solutions within existing toolchains. The management data 120 in the REST HTTP request 128 can be expressed using JSON based on OData. Although the embodiments disclosed herein are described primarily as utilizing REDFISH, the REST HTTP requests 128 and responses disclosed herein can be formatted according to other specifications in other embodiments.

In one embodiment, the REST over IPMI driver 124 receives the REST HTTP request 128 from the firmware driver 122. In response thereto, the REST over IPMI driver 124 generates an OEM IPMI command 126 that encapsulates the REST HTTP request 128. The REST over IPMI driver 124 then provides the OEM IPMI command 126 to the BMC of the managed computing system 102. Details regarding the encapsulation of a REST HTTP request 128 in an OEM IPMI command 126 are provided below with regard to FIG. 3.

In one embodiment, the BMC 106 includes an IMPI agent 118, which is a software component that receives the OEM IPMI command 126 from the REST over IPMI driver 124 executing in the firmware 104 of the managed computing system 102. In response thereto, the IMPI agent 118 extracts the REST HTTP request 128 from the OEM IPMI command 126 and provides the REST HTTP request 128 to an interface (not shown in FIG. 1) exposed by a management server 108 executing in the BMC 106. In one embodiment, the interface provided by the management server 108 is implemented as a REDFISH-compatible REST interface provided over secure HTTPS that utilizes a JSON format that is based on OData. The management server 108 provides the management data 120 to a management agent 112 that stores the management data 120 in a data store 116 located in the BMC 106.

The management server 108 also generates a REST HTTP response 130 to the REST HTTP request 128 such as, for example, a response 130 including data indicating that processing of the REST HTTP request 128 was successful. The REST HTTP response 130 is compatible with the REDFISH management standard in embodiments disclosed herein. The management server 108 provides the REST HTTP response 130 to an interface (not shown in FIG. 1) exposed by the IMPI agent 118 executing in the BMC 106. The interface exposed by the IPMI agent 118 to the management server 108 is also compatible with the REDFISH standard in embodiments disclosed herein. The IMPI agent 118, in turn, receives the REST HTTP response 130 from the management server 108 and generates an OEM IPMI response 132 that includes the REST HTTP response 130. The IMPI agent 118 then provides the OEM IPMI response 132 that includes the REST HTTP response 130 to the REST over IPMI driver 124.

The REST over IPMI driver 124 receives the OEM IPMI response 132 that includes the REST HTTP response 130 from the IMPI agent 118. The REST over IPMI driver 124 then extracts the REST HTTP response 130 from the OEM IPMI response 132 received from the IMPI agent 118. The REST over IPMI driver 124 then provides the REST HTTP response 130 to an interface exposed by the firmware driver 122. In this manner, OEM IPMI commands 126 and responses 132 can be utilized to encapsulate RESTful HTTP requests 128 and responses 130 and, thereby, provide a REST over IPMI interface for enabling communication between a firmware 104 and a BMC 106.

In some embodiments, the management server 108 also exposes a REDFISH-compatible interface (not shown in FIG. 1) through which management clients 110 can request the management data 120. In response to receiving such a request, the management server 108 can retrieve the requested management data 120 from the data store 116 and provide the requested management data 120 to the management client 110. This interface can be provided over an OOB network connection between the BMC and the management client 110, for example.

It is to be appreciated that FIG. 1 and the other FIGS. have been simplified for discussion purposes, and that many other software and hardware components can be utilized to implement the functionality disclosed herein. For example, and without limitation, various networks and networking components can be utilized to connect the management client 110 to the BMC 106. In this regard, it is also to be appreciated that while only a single managed computing system 102 and a single management client 110 have been illustrated in FIG. 1, many such computing systems can be utilized in various configurations.

Figure 2A:
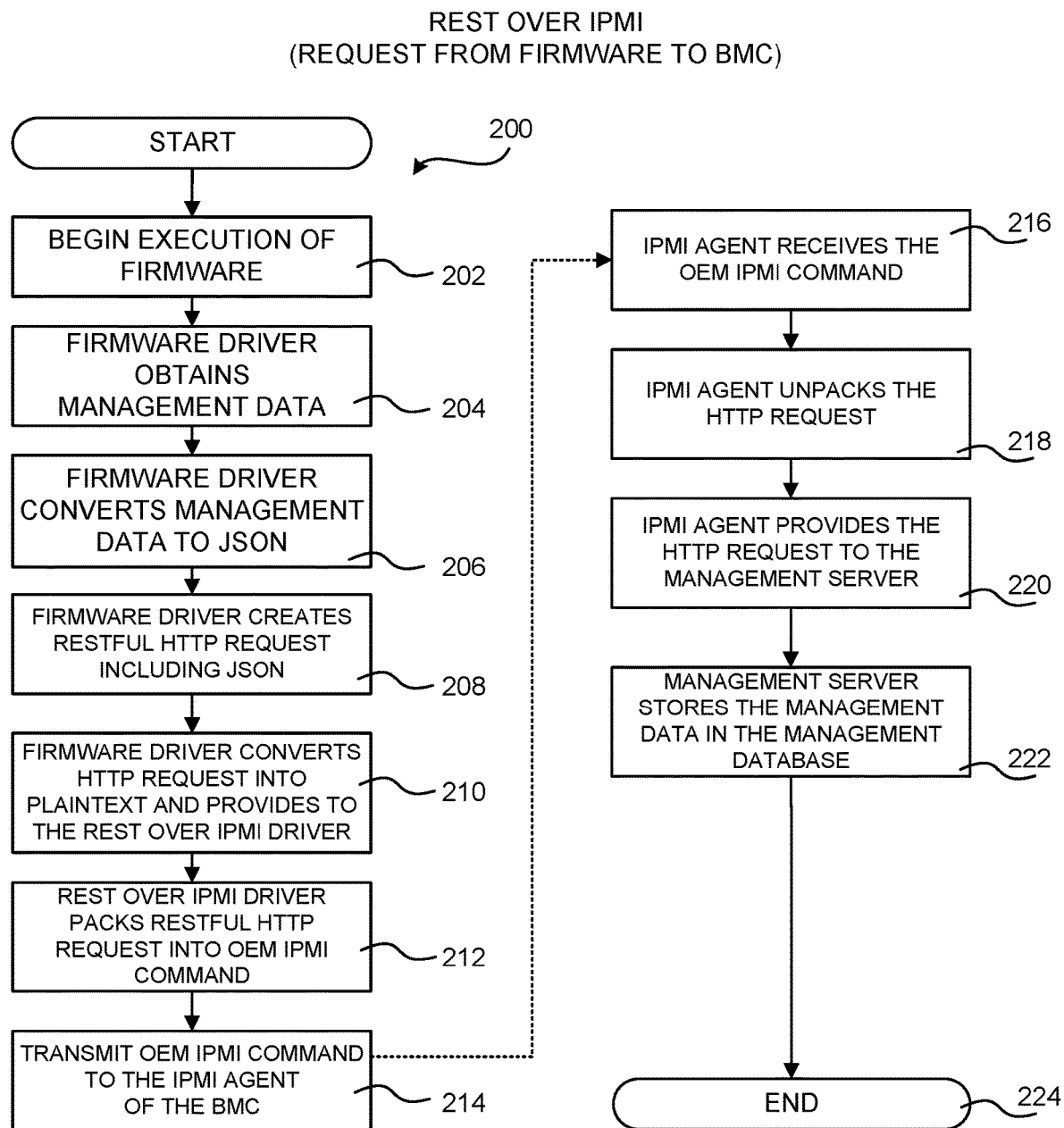
FIGS. 2A and 2B are flow diagrams showing a routine that illustrates aspects of the operation of the managed computing system shown in FIG. 1 for providing a REST over IPMI interface for firmware to BMC communication, according to one embodiment presented herein.
Figure 2B:
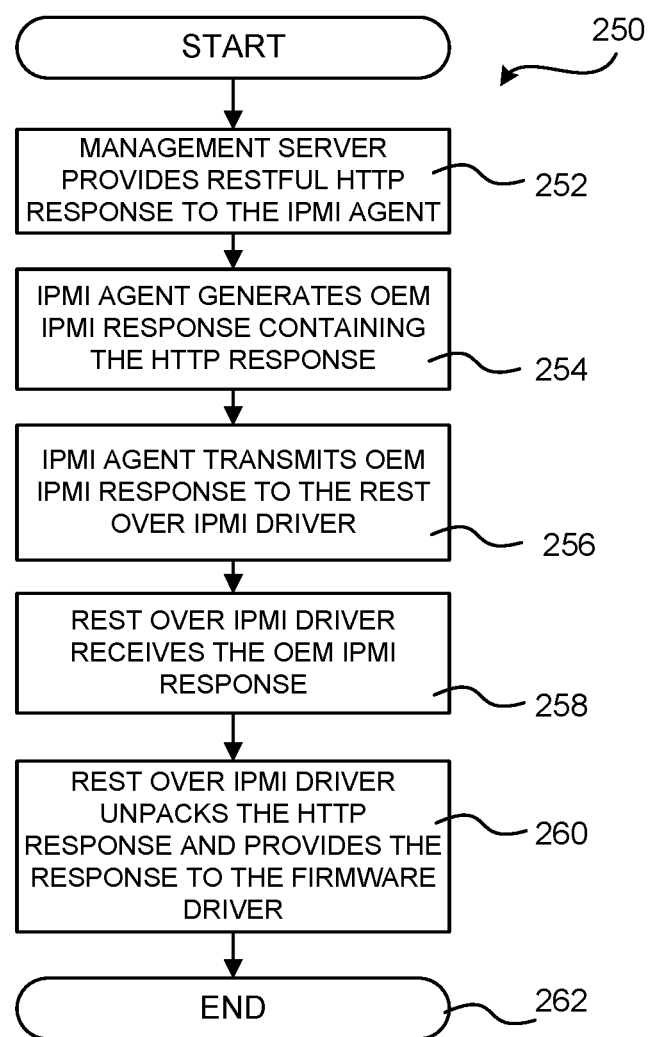

FIGS. 2A and 2B are flow diagrams showing a routine 200 and a routine 250, respectively, that illustrate aspects of the operation of the managed computing system 102 shown in FIG. 1 for providing a REST over IPMI interface for firmware 104 to BMC 106 communication, according to one embodiment presented herein. It is to be appreciated that the logical operations described herein with respect to FIGS. 2A and 2B, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 200 shown in FIG. 2A illustrates one method for generating a RESTful HTTP request 128 from the firmware 104 to the BMC 106. The routine 200 begins at operation 202, where the firmware 104 of the managed client BMC 106 begins execution. This might occur, for example, immediately following the powering on or rebooting of the managed computing system 102. The routine 200 then proceeds to operation 204, where the firmware driver 122 obtains the management data 120. From operation 204, the routine 200 proceeds to operation 206.

At operation 206, the firmware driver 122 converts the management data 120 to JSON. The routine 200 then proceeds from operation 206 to operation 208, where the firmware driver 122 creates a REDFISH-compatible REST HTTP request 124 that includes the JSON management data 120. The firmware driver 122 then converts the REST HTTP request 126 to plaintext and provides the converted REST HTTP request 128 to the REST over IPMI driver 124 at operation 210. The routine 200 then proceeds from operation 210 to operation 212.

At operation 212, the REST over IPMI driver 124 packs, or encapsulates, the REST HTTP request 128 into the OEM IPMI command 126. Details regarding the structure of the OEM IPMI command 126 will be provided below with regard to FIG. 3. From operation 212, the routine 200 proceeds to operation 214, where the REST over IPMI driver 124 transmits the OEM IPMI command 126 to the IPMI agent 118 executing in the BMC 106. The IPMI agent 118 receives the OEM IPMI command 126 at operation 216. The routine 200 then proceeds from operation 216 to operation 218.

At operation 218, the IPMI agent 118 unpacks the REST HTTP request 128 from the OEM IPMI command 126. The routine 200 then proceeds to operation 220, where the IPMI agent 118 then provides the REST HTTP request 128 to the interface exposed by the management server 108. As discussed above, the interface exposed by the management server 108 is REDFISH-compatible in some implementations.

From operation 220, the routine 200 proceeds to operation 222, where the management server 108 provides the management data 120 contained in the REST HTTP request 128 to the management agent 112 for storage in the data store 116 of the BMC 106. As discussed above, the management server 108 can then make the management data 120 available to management clients 110 via a REDFISH-compatible RESTful interface. The routine 200 then proceeds from operation 222 to operation 224, where it ends.

The routine 250 shown in FIG. 2B illustrates one method for generating a RESTful HTTP response from the BMC 106 to the firmware 104. The routine 250 begins at operation 252, where the management server 108 generates a REST HTTP response 130 and provides the response 130 to the IPMI agent 118. The routine 250 then proceeds from operation 252 to operation 254, where the IPMI agent 118 generates an OEM IPMI response 132 that contains the REST HTTP response 130. The routine 250 then proceeds from operation 254 to operation 256.

At operation 256, the IPMI agent 118 transmits the OEM IPMI response 132 to the REST over IPMI driver executing 124 in the firmware 104. The routine 250 then proceeds to operation 258, where the REST over IPMI driver 124 receives the OEM IPMI response 132 from the IPMI agent 118. The REST over IPMI driver 124 extracts the REST HTTP response 130 from the OEM IPMI response 132 and provides the REST HTTP response 130 to the firmware driver 122 at operation 260. The routine 250 then proceeds to operation 262, where it ends.

Figure 3:
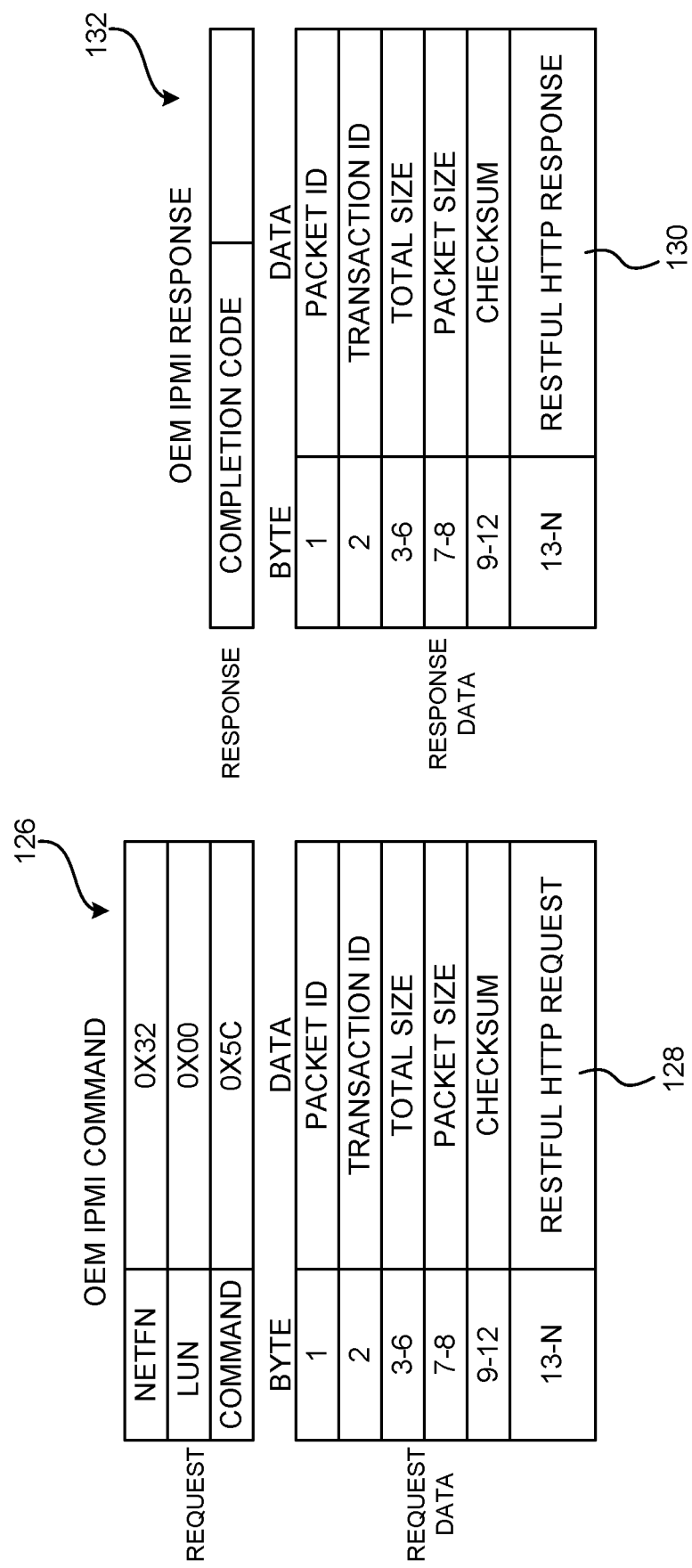
FIG. 3 is a data structure diagram showing aspects of the configuration of an OEM IPMI command and an OEM IPMI response that can be utilized in embodiments to provide a REST over IPMI interface for firmware to BMC communication.

FIG. 3 is a data structure diagram showing aspects of the configuration of an OEM IPMI command 126 and an OEM IPMI response 132 that can be utilized in embodiments to provide a REST over IPMI interface for firmware to BMC 106 communication. As shown in FIG. 3, the OEM IPMI command 126 includes a number of data fields. In particular, the OEM IPMI command 126 includes an NETFN field set to 0x32, a LUN field set to 0x00, and a command field set to 0x5C.

Because IPMI commands have a 16 k transaction limit, the embodiments disclosed herein can utilize multiple OEM IPMI commands to transmit a single REST HTTP request 128 that is larger than 16 k. In order to accomplish this, OEM IPMI commands 126 generated by the REST over IPMI driver 124 can include data indicating that it is a partial command. The IMPI agent 118 can utilize this information to gather and recreate a single REST HTTP request 128 from the multiple OEM IPMI commands 126 transmitted by the REST over IPMI driver 124.

In particular, the OEM IPMI command 126 includes a packet ID field, a transaction ID field, a total size field, a packet size field, and a checksum field. The OEMI IPMI command 126 also includes a payload field that stores the REST HTTP request 128. The packet ID field stores a one byte command identifier. Bit zero of the packet ID field indicates a start of a transaction and is utilized by both the firmware 104 and the BMC 106. Bit one of the packet ID field indicates the end of a transaction and is utilized by both the firmware 104 and the BMC 106. Bit two of the packet ID field is set by the firmware 104 to instruct the BMC 106 to send the last packet again. Bit three of the packet ID field is set by the firmware 104 in order to confirm that a transaction has completed and to instruct the BMC 106 to release any temporary buffers utilized to store partial IMPI commands. Bit four of the packet ID field is set by the firmware 104 in order to interrupt a current transaction. Bits five through seven of the packet ID field are reserved.

The transaction ID field includes a unique transaction identifier for the current transaction. The total size field stores data indicating the total size of the IPMI command in bytes. The packet size field stores data indicating the size of the current packet in bytes. The checksum field stores a checksum (e.g. CRC-32) on all request data including the packet ID field, the transaction ID field, the total size field, the packet size field, the packet ID field, and the REST HTTP payload.

As also shown in FIG. 3, the OEM IPMI response 132 also includes a number of data fields. In particular, the OEMI IPMI response 132 includes a completion code field. The completion code can store data indicating: success; invalid command; invalid request length; invalid request bytes; out of memory; invalid transfer identifier; invalid checksum; no response from the management server 108; or that the transaction identifier is to be freed.

In order to support the use of multiple OEM IPMI responses 132 to transmit a single REST HTTP response 130, the OEM IPMI response 132 also includes a packet ID field, a transaction ID field, a total size field, a packet size field, and a checksum field. The OEMI IPMI response 132 also includes a payload field that includes the REST HTTP response 130. Data stored in the packet ID field, transaction ID field, total size field, packet size field, and checksum field can be utilized to transmit a single REST HTTP response 130 using multiple OEM IPMI responses 132 in a manner similar to that described above with regard to the transmission of an OEM IPMI command 126.

Firmware Configuration Using Rest Over IPMI Interface

Figure 4:
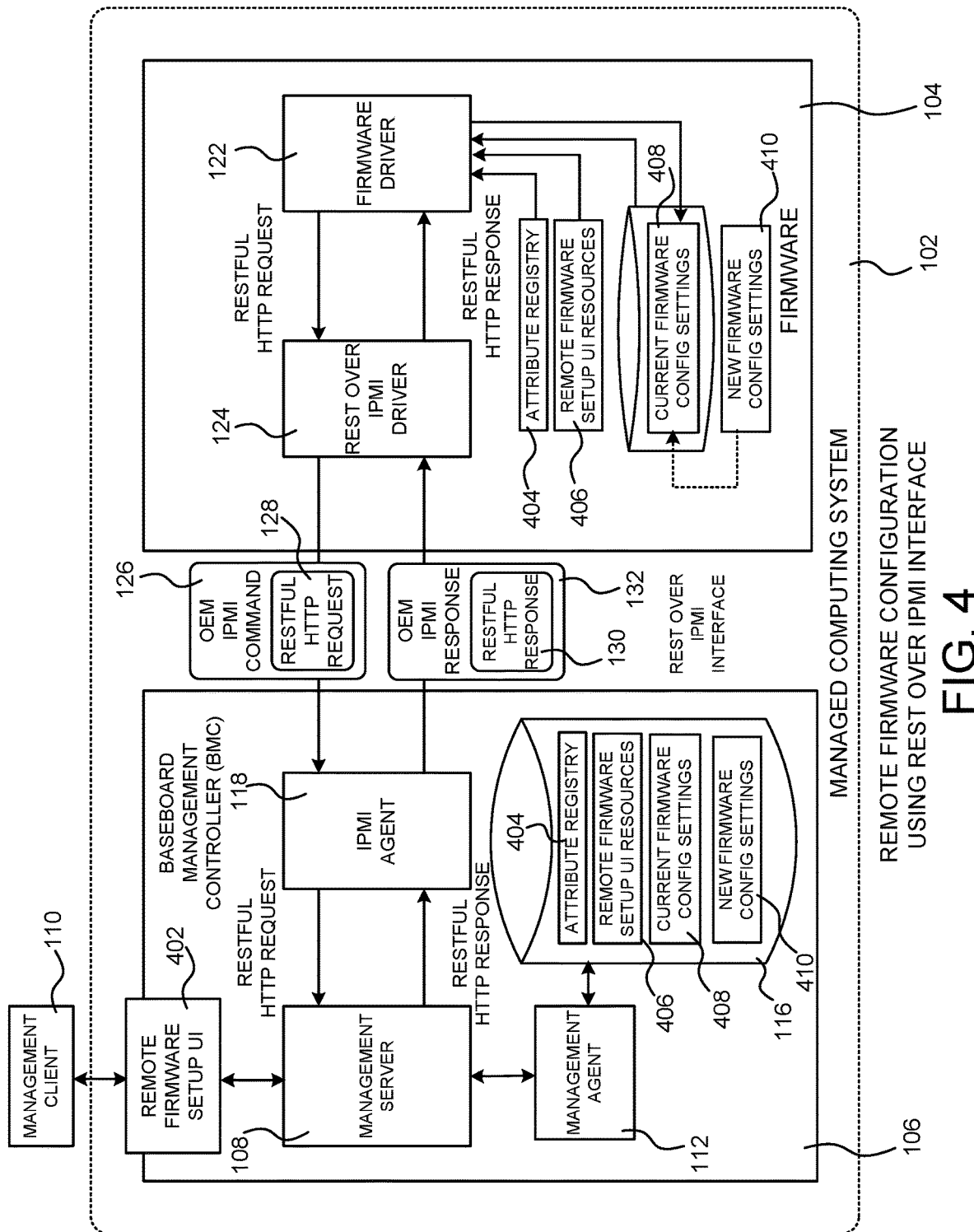
FIG. 4 is a software architecture diagram illustrating aspects of a mechanism for remote firmware configuration utilizing a REST over IPMI interface for firmware to BMC communication, according to one or more embodiments presented herein.

FIG. 4 is a software architecture diagram illustrating aspects of a mechanism for remote firmware configuration utilizing a REST over IPMI interface for firmware 104 to BMC 106 communication, according to one or more embodiments presented herein. The REST over IPMI interface described above is utilized in one embodiment to remotely configure the firmware 104 from a management client 110.

In order to provide this functionality, the firmware driver 122 executing in the firmware 104 of the managed computing system 102 transmits a REST HTTP request 128 (e.g. an HTTP POST request) that includes data for generating a remote firmware setup UI 402 to the BMC 106 over the REST over IPMI interface described above. The management server 108 can utilize the provided data to generate a remote firmware setup UI 402. The management client 110 can utilize the remote firmware setup UI 402 to view current configuration settings for the firmware 104, and to provide new configuration settings for use in configuring the firmware 104.

The data provided by the firmware driver 122 to the management server 108 can include, for instance, an attribute registry 404 and remote firmware setup UI resources 406. The attribute registry 404 contains data defining the valid questions for defining configuration settings for the firmware 104. The attribute registry 404 can also specify valid values for each of the setup questions. The questions can be presented in the remote firmware setup UI 402. The firmware 104 generates the attribute registry using JSON in one embodiment.

The remote firmware setup UI resources 406 include resources for use by the management server 108 in generating the remote firmware setup UI 402. For example, and without limitation, the firmware setup UI resources 406 can include HTML, JavaScript, and other resources that can be utilized to present the questions identified in the attribute registry 404 and to receive new firmware configuration settings 410 from the management client 110.

The data in the REST HTTP request 128 can also include current firmware configuration settings 408 for the managed computing system 102. The attribute registry 404, remote firmware setup UI resources 406, and the current firmware configuration settings 408 can be transmitted from the firmware 104 to the BMC 106 using multiple OEM IPMI commands 126 containing single REST HTTP requests 128 in the manner described above.

As mentioned above, the management server 108 executing in the BMC 106 receives the data in the REST HTTP request 128 and utilizes the data to generate the remote firmware setup UI 402 for use by remote management clients 110. For example, and without limitation, the remote firmware setup UI 402 can be utilized to submit new configuration settings 410 for the firmware 104. The management server 108 can receive the new configuration settings 410 from the management client 110 and transmit the new configuration settings 410 to the firmware 104 over the REST over IPMI interface described above.

At boot time of the managed computing system 102, the firmware driver 122 can query the BMC 106 to determine if new firmware configuration settings 410 are available. If new settings 410 are available, the firmware 104 receives the new configuration settings 410 from the BMC 106, and configures the firmware 104 with the new configuration settings 410. The firmware 104 can request the new firmware configuration settings from the BMC 106 following a reboot of the managed computing system 102. In turn, the BMC 106 can transmit the new configuration settings to the firmware 104 over the REST over IPMI interface following the reboot. If any of the changed configuration settings are not applied for any reason, the firmware 104 can transmit data identifying the un-applied settings to the BMC 106.

Figure 5A:
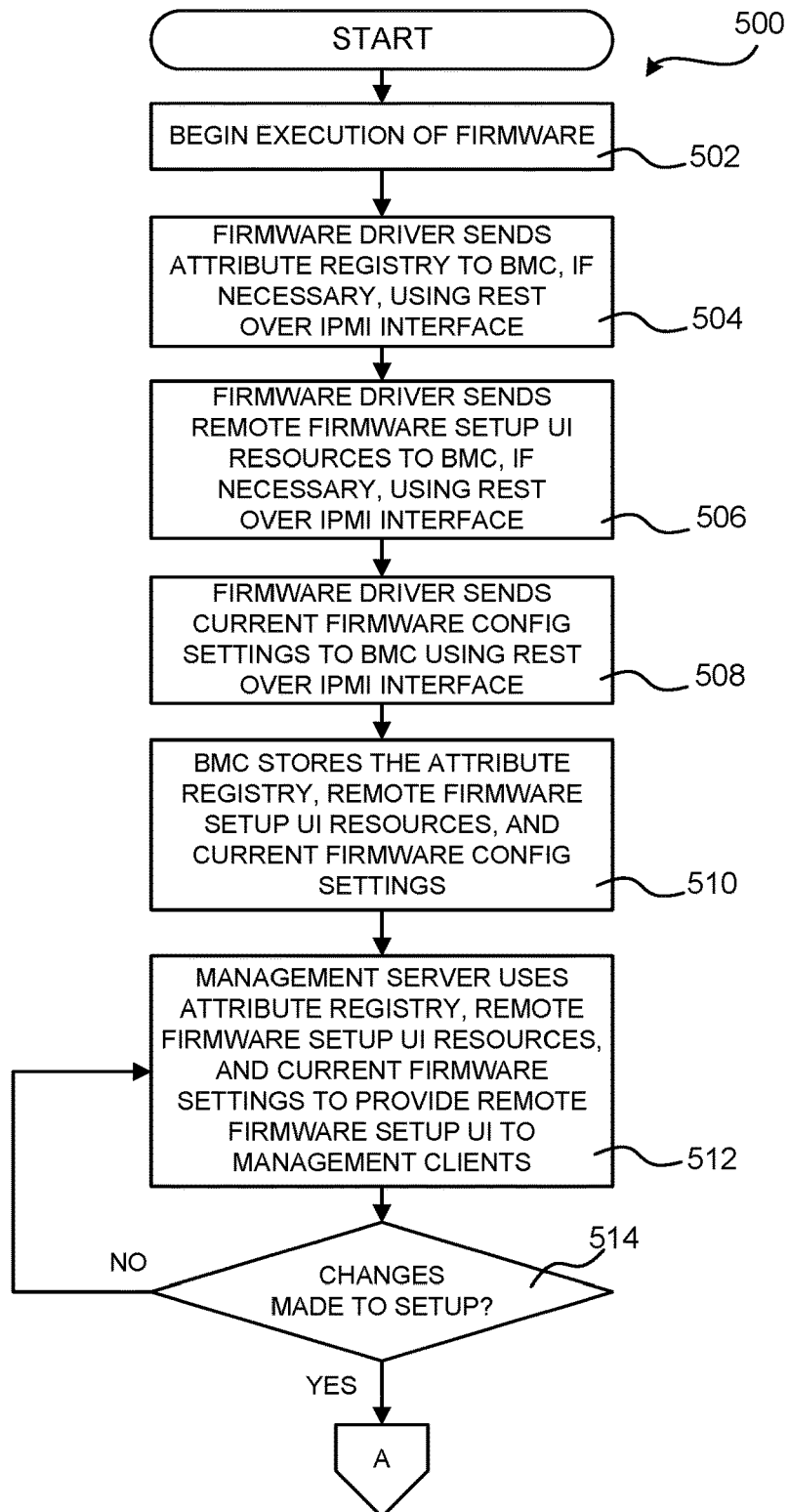
FIGS. 5A and 5B are flow diagrams showing a routine that illustrates aspects of the operation of the managed computing system shown in FIG. 4 for remotely configuring a firmware using a REST over IPMI interface for firmware to BMC communication, according to one embodiment presented herein.
Figure 5B:
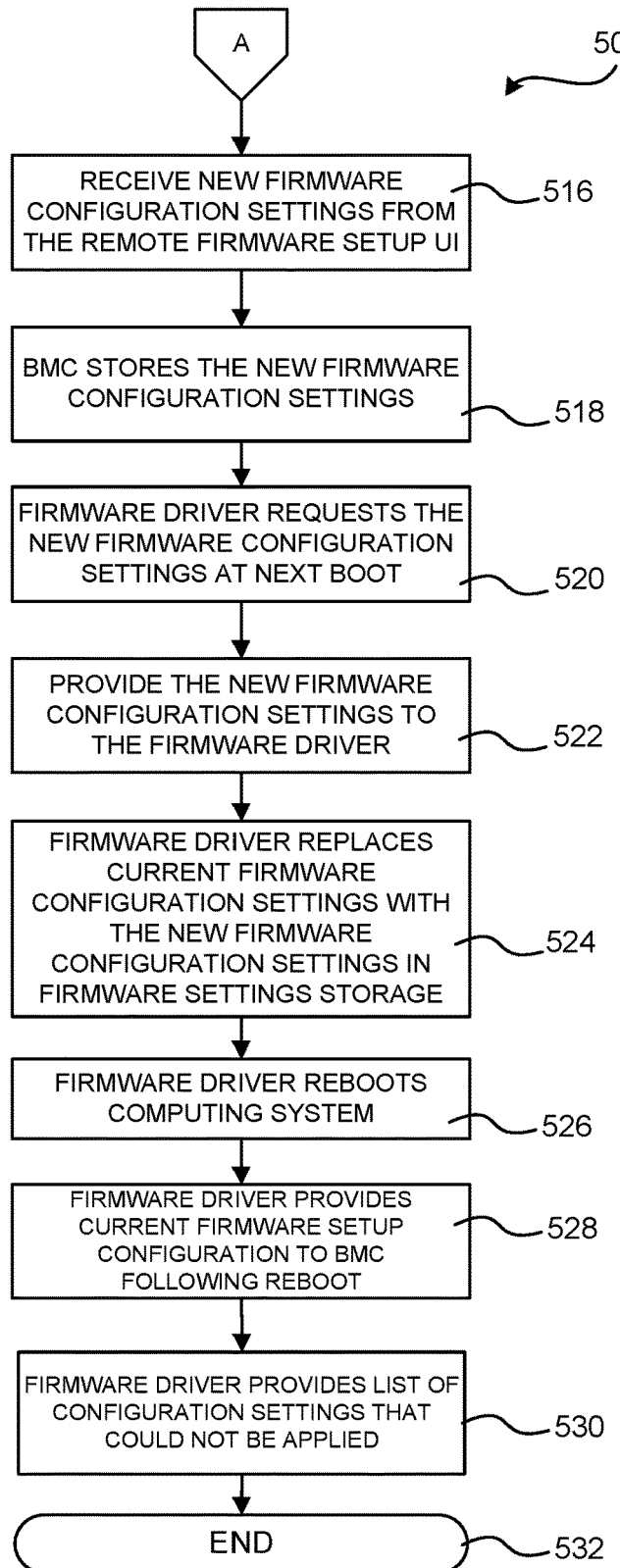

FIGS. 5A and 5B are flow diagrams showing a routine 500 that illustrates aspects of the operation of the managed computing system 102 shown in FIG. 4 for remotely configuring a firmware 104 using a REST over IPMI interface for firmware 104 to BMC 106 communication, according to one embodiment presented herein. The routine 500 begins at operation 502, where the firmware 104 begins execution. The routine 500 then proceeds to operation 504, where the firmware driver 122 generates the attribute registry 404 and transmits the attribute registry 404 to the BMC 106 using the REST over IPMI interface, if necessary. It might be necessary to transmit the attribute registry 404 to the BMC 106 following an update to the firmware 104 or if the attribute registry 404 has not been previously provided to the BMC 106. In some embodiments, the firmware driver 122 can query the BMC 106 over the REST over IPMI interface to identify the version of the attribute registry 404 and the remote firmware setup UI resources 406. If the version of the attribute registry 404 and the remote firmware setup UI resources 406 stored by the BMC 106 are current, the firmware driver 122 will not send these components to the BMC 106.

From operation 504, the routine 500 proceeds to operation 506, where the firmware driver generates the remote firmware setup UI resources 406 and transmits the remote firmware setup UI resources 406 to the BMC 106 using the REST over IPMI interface, if necessary. As in the case of the attribute registry 404, it might be necessary to transmit the remote firmware setup UI resources 406 to the BMC 106 following an update to the firmware 104 or if the remote firmware setup UI resources 406 have not been previously provided to the BMC 106.

From operation 506, the routine 500 proceeds to operation 508, where the firmware driver 122 transmits the current firmware configuration settings 408 to the BMC 106 using the REST over IPMI interface described above. The BMC 106 receives the attribute registry 404, the remote firmware setup UI resources 406, and the current firmware configuration settings 408 from the firmware driver 122, and stores these items in the data store 116 at operation 510.

The routine 500 then proceeds from operation 510 to operation 512, where the management server 108 utilizes the attribute registry 404, the remote firmware setup UI resources 406, and the current firmware configuration settings 408 to provide the remote firmware setup UI 402 to management clients 110. As discussed above, the management clients 110 can utilize the remote firmware setup UI 402 to provide new firmware configuration settings 410.

If new firmware configuration settings 410 are provided by way of the remote firmware setup UI 402, the routine 500 proceeds from operation 514 to operation 516, shown in FIG. 5B. At operation 516, the management server 108 receives the new firmware configuration settings 410. The routine 500 then proceeds from operation 516 to operation 518, where the management server 108 stores the new configuration settings 410 in the data store 116.

From operation 518, the routine 500 proceeds to operation 520, where the firmware driver 122 requests the new firmware configuration settings 410 from the BMC 106 using the REST over IPMI interface at the next boot of the managed computing system 102. The routine 500 then proceeds from operation 520 to operation 522, where the BMC 106 provides the new firmware configuration settings 410 to the firmware driver 122 using the REST over IPMI interface.

From operation 522, the routine 500 proceeds to operation 524, where the firmware driver 122 replaces the current firmware configuration settings 408 with the new configuration settings 410. The firmware driver 122 then initiates a reboot of the managed computing system 102. The new firmware configuration settings 408 are utilized to configure the firmware 104 following the reboot.

In some embodiments, the firmware driver 122 provides the current firmware configuration settings to the BMC 106 following the reboot. This occurs at operation 528. The BMC 106 can utilize the current firmware configuration settings to confirm that the new firmware configuration settings 410 were correctly applied. If some of the new configuration settings 410 could not be applied to the firmware 104, the firmware driver 122 provides a list of the configuration settings that could not be applied to the BMC 106 at operation 530. The list of configuration settings that could not be applied might then be presented in the remote firmware setup UI 402. The routine 500 then proceeds from operation 530 to operation 532, where it ends.

Firmware Update Using Rest Over IPMI Interface

Figure 6:
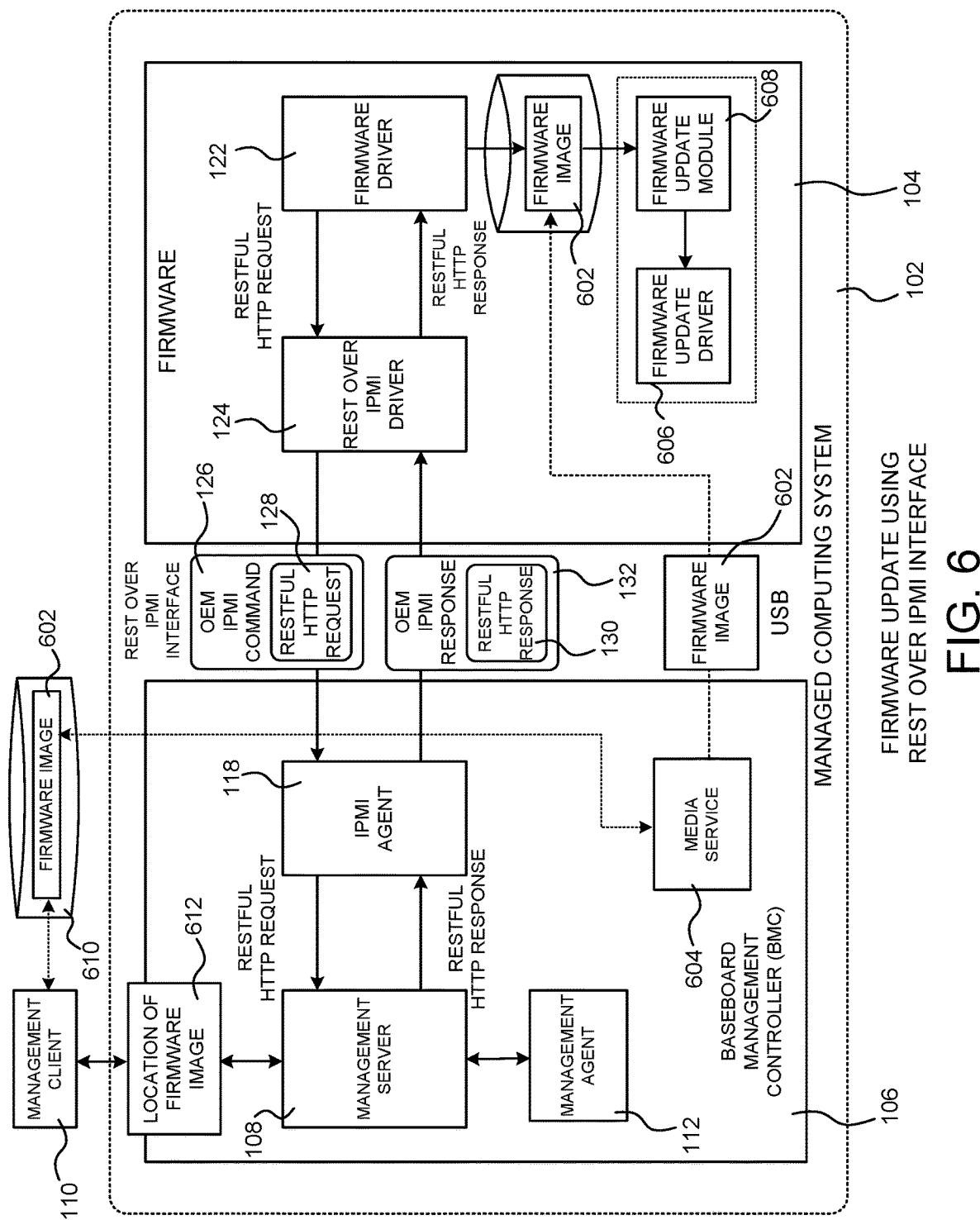
FIG. 6 is a software architecture diagram illustrating aspects of a mechanism for updating a firmware utilizing a REST over IPMI interface for firmware to BMC communication, according to one or more embodiments presented herein.

FIG. 6 is a software architecture diagram illustrating aspects of a mechanism for updating a firmware 104 utilizing a REST over IPMI interface for firmware 104 to BMC 106 communication, according to one or more embodiments presented herein. In order to provide this functionality, the firmware driver 122 transmits a request for a firmware update instruction (not shown in FIG. 6) from the firmware 104 to the BMC 106 over the REST over IPMI interface described above. The firmware update instruction includes data indicating whether the firmware 104 is to be updated.

In response to receiving the firmware update instruction, the BMC 106 provides data identifying a location of a firmware image 602 to the firmware driver 122, also over the REST over IPMI interface. As illustrated in FIG. 6, the firmware image 602 might be stored in an external data store 610, such as a network location.

The firmware driver 122 retrieves the firmware image 602 from the location of the firmware image 612 identified by the data provided by the BMC 106. In one embodiment, for example, the BMC executes a media service 604 that can retrieve the firmware image 602 from the data store 610 and provide the firmware image 602 to a firmware update module 608 executing in the firmware 104. The media service 604 can provide a remote media ("RMEDIA") server to the firmware update module 608 in some embodiments.

The firmware update module 608 then utilizes a firmware update driver 606 in some embodiments to update the firmware 104 of the computing system using the firmware image 602. The firmware update module 608 can also send data describing the success or failure of the updating of the firmware 104 to the BMC 106.

In one embodiment, the BMC 106 transmits the data identifying the location of the firmware image 602 by storing non-standard data in a standard REDFISH property. The standard REDFISH property might, for example, be a property for identifying a location of a boot device of the managed computing system 102. In particular, the "UEFI-TARGETBOOTSOURCEOVERRIDE" REDFISH property is utilized to store the firmware update instruction in some embodiments. The BMC 106 can also transmit the data identifying the location of the firmware image 602 and firmware update options by storing non-standard data in a standard REDFISH property in a similar way.

As in the embodiments described above, the request for the firmware update instruction can be transmitted from the firmware driver 122 to the BMC 106 using OEM IPMI commands containing REST requests. As also in the embodiments described above, the request for the firmware update instruction can be expressed using a JSON format based on OData.

The BMC 106 can also transmit the data identifying the location of the firmware image 602 to the firmware driver 122 using OEM IPMI responses 132 containing REST responses. The data identifying the location of the firmware image 602 can also be expressed using a JSON format based on OData. Similarly, the data describing the success or failure of the updating of the firmware 104 can also be expressed using a JSON format based on OData. Additional details regarding the updating of the firmware 104 using the REST over IPMI interface will be provided below with regard to FIG. 7.

Figure 7:
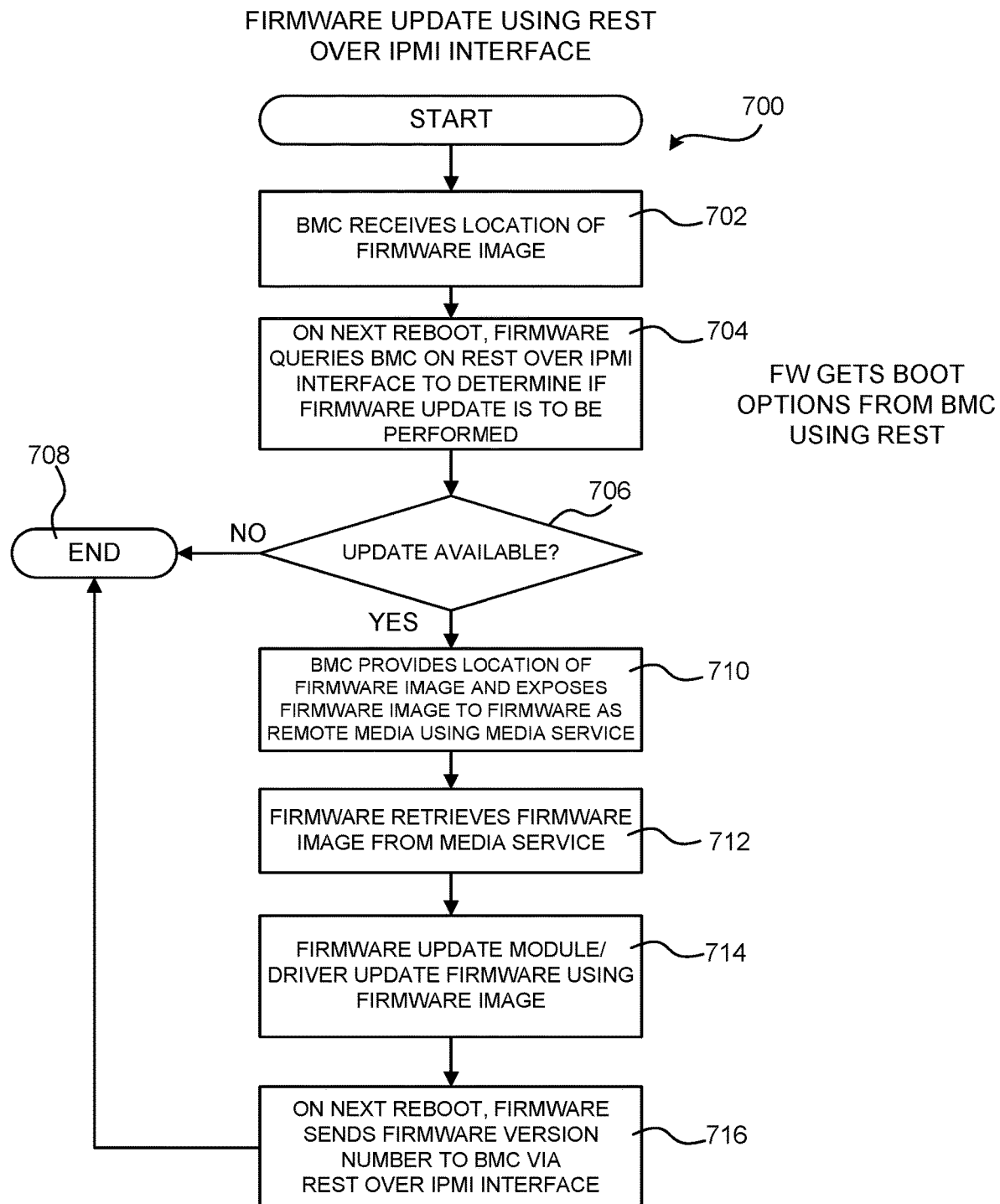
FIG. 7 is a flow diagram showing a routine that illustrates aspects of the operation of the managed computing system shown in FIG. 6 for updating a firmware using a REST over IPMI interface for firmware to BMC communication, according to one embodiment presented herein.

It is to be appreciated that while the embodiment discussed above with regard to FIG. 6, and further below with regard to FIG. 7, is primarily presented in the context of using a REST over IPMI interface for firmware to BMC communication, this embodiment can utilize other mechanisms for firmware to BMC communication. For example, and without limitation, the embodiment shown in FIG. 6 can utilize communication between the firmware 104 and the BMC 106 over a REST transport protocol on top of any available communication protocol, such as HTTP, MCTP, etc. including the IPMI. Accordingly, this embodiment is not limited to use with the REST over IPMI interface disclosed herein.

FIG. 7 is a flow diagram showing a routine that illustrates aspects of the operation of the managed computing system 102 shown in FIG. 6 for updating a firmware 104 using a REST over IPMI interface for firmware 104 to BMC 106 communication, according to one embodiment presented herein. The routine 700 begins at operation 702, where the BMC 106 receives data identifying the location of the firmware image 602, such as from a management client 110. The routine 700 then proceeds from operation 702 to operation 704, where the firmware driver 122 queries the BMC 106 for a firmware update instruction following the next reboot of the managed computing system 102.

If a firmware update is not to be performed, the routine 700 proceeds from operation 706 to operation 708, where it ends. If a firmware update is to be performed, the routine 700 proceeds from operation 706 to operation 710, where the BMC 106 provides the location of the firmware image 602 to the firmware driver 122. As discussed above, the firmware update instruction and the location of the firmware images can be defined using non-standard data in a standard REDFISH property. The BMC 106 also exposes the firmware image 602 to the firmware driver 122 as remote media by way of the media service 604 in some configurations.

From operation 710, the routine 700 proceeds to operation 712, where the firmware 104 retrieves the firmware image 602 from the media service 604 in some embodiments. The firmware 104 then stores the firmware image 602 for use by the firmware update module 608 and the firmware update driver 606.

From operation 712, the routine 700 proceeds to operation 714, where the firmware update module 608, in conjunction with the firmware update driver 606, updates the firmware 104 using the firmware image 602. The routine 700 then proceeds to operation 716 where, on the next reboot of the managed computing system 102, the firmware 104 sends the version number of the firmware 104 to the BMC 106 via the REST over IPMI interface. The BMC 106 can utilize the version number to confirm that the firmware 104 was successfully updated. The routine 700 then proceeds from operation 716 to operation 708, where it ends.

Peripheral Device Firmware Update Using Rest Over IPMI Interface (Firmware Update Module)

Figure 8:
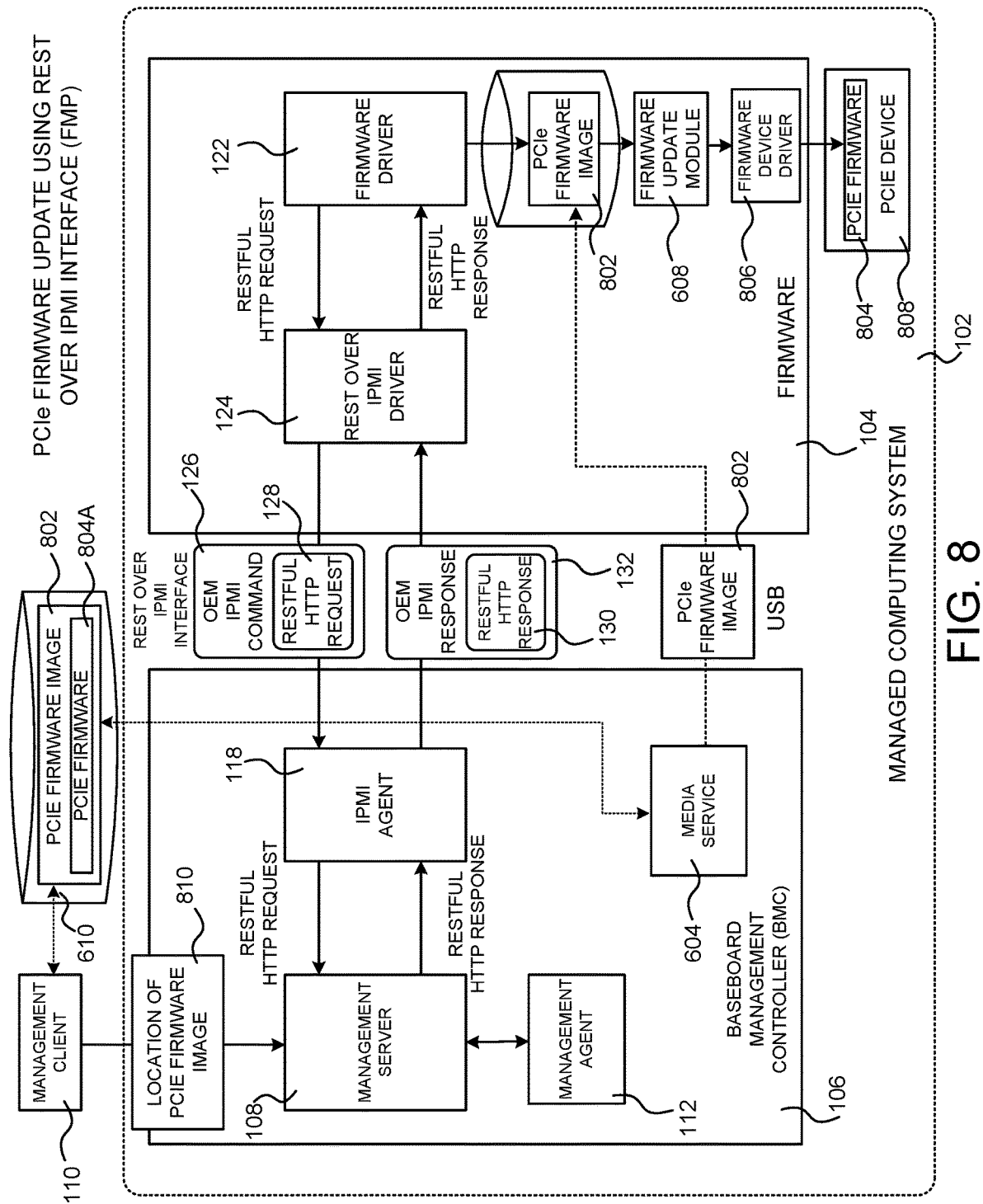
FIG. 8 is a software architecture diagram illustrating aspects of a mechanism for updating a firmware of a peripheral device utilizing a firmware module and a REST over IPMI interface for firmware to BMC communication, according to one or more embodiments presented herein.

FIG. 8 is a software architecture diagram illustrating aspects of a mechanism for updating a firmware 104 of a peripheral device 808 connected to the managed computing system 102 utilizing a REST over IPMI interface for firmware 104 to BMC 106 communication, according to one or more embodiments presented herein. The disclosed mechanism can, for example, be utilized to update a PCIe firmware 804 of a PCIe device or a firmware of another type of peripheral device 808 connected to the managed computing system 102.

In order to update the firmware 804 of a peripheral device 808, the firmware driver 122 executing in the firmware 104 of the managed computing system 102 transmits a request for a firmware update instruction (not shown in FIG. 8) for the peripheral device 808 to the BMC 106 over the REST over IPMI interface described above. The firmware update instruction for the peripheral device 808 indicates whether the firmware 804 of the peripheral device 808 is to be updated. The BMC 106 receives the request and, if the firmware 804 of the peripheral device 808 is to be updated, provides data to the firmware driver 122 identifying a location of a peripheral device firmware image 802 containing an updated firmware 804A for the peripheral device 808 over the REST over IPMI interface. The data 810 identifying the location of the peripheral device firmware image 802 can, for example, be specified by a management client 110.

The firmware driver 122 then utilizes the data 810 provided by the BMC 106 to retrieve the peripheral device firmware image 802 from the specified location. In some embodiments, the BMC 106 stores and provides the peripheral device firmware image 802 to the firmware 104 such as, for example, by exposing remote media to the firmware driver 122 by way of the media server 604. Once the peripheral device firmware image 802 has been retrieved, a firmware update module 608 executing in the firmware 104 utilizes a firmware device driver 806 to update the firmware 804 of the peripheral device 808 using the updated firmware 804A contained in the peripheral device firmware image 802.

As in the embodiment described above, the data identifying the firmware update request for the peripheral device 808 and the data 810 specifying the location of the peripheral device firmware image 802 can be generated by placing non-standard data stored in a standard REDFISH property. The standard REDFISH property might, for example, be a property such as that identified above for specifying a location of a boot device of the managed computing system 102. Similarly, the data 810 identifying the location of the peripheral device firmware image 802 and the firmware update request for the peripheral device 808 can be transmitted using OEM IPMI commands or responses containing REST HTTP requests or responses. As also in the embodiments described above, the data identifying the location of the peripheral device firmware image 802 can be expressed using a JSON format based on OData.

Figure 9:
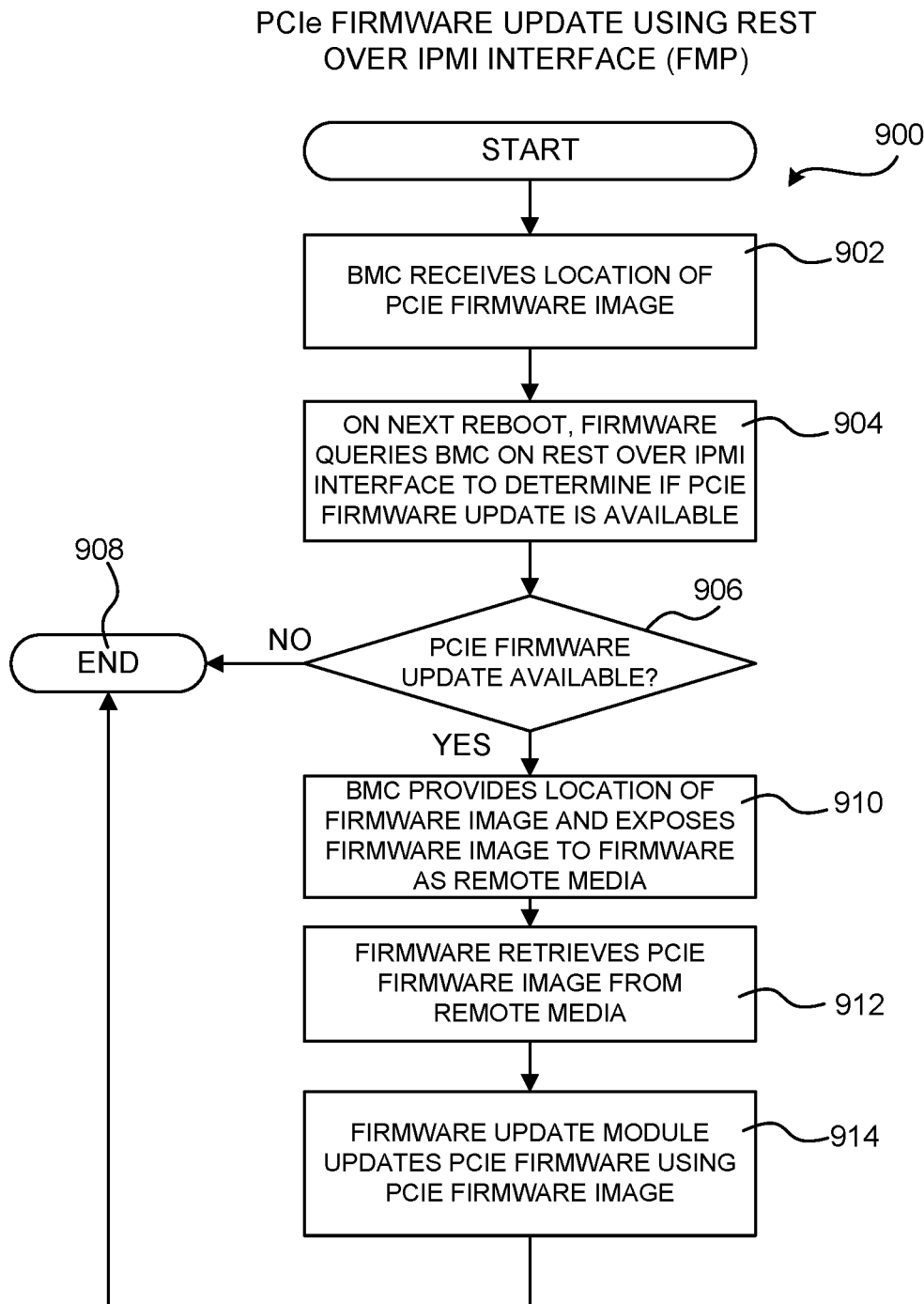
FIG. 9 is a flow diagram showing a routine that illustrates aspects of the operation of the managed computing system shown in FIG. 8 for updating a firmware of a peripheral device using a firmware update module and a REST over IPMI interface for firmware to BMC communication, according to one embodiment presented herein.

It is to be appreciated that while the embodiment discussed above with regard to FIG. 8, and further below with regard to FIG. 9, is primarily presented in the context of using a REST over IPMI interface for firmware to BMC communication, this embodiment can utilize other mechanisms for firmware to BMC communication. For example, and without limitation, the embodiment shown in FIG. 8 can utilize communication between the firmware 104 and the BMC 106 over a REST transport protocol on top of any available communication protocol, such as HTTP, MCTP, etc. including the IPMI. Accordingly, this embodiment is not limited to use with the REST over IPMI interface disclosed herein.

FIG. 9 is a flow diagram showing a routine 900 that illustrates aspects of the operation of the managed computing system 102 shown in FIG. 8 for updating a firmware of a peripheral device 808 using a REST over IPMI interface for firmware to BMC 106 communication, according to one embodiment presented herein. The routine 900 begins at operation 902, where the management server 108 receives data 810 specifying the location of a peripheral device firmware image 802. As mentioned above, the data 810 specifying the location of a peripheral device firmware image 802 can be provided by a management client 810.

The routine 900 proceeds from operation 902 to operation 904 where, upon the next reboot of the managed computing system 102, the firmware driver 122 queries the BMC 106 using the REST over IPMI interface for a peripheral device firmware update instruction at operation 906 indicating whether an update to the firmware 804 of a peripheral device 808 is available. If no firmware update is available, the routine 900 proceeds from operation 906 to operation 908, where it ends.

If a firmware update is available for the peripheral device 808, the routine 900 proceeds from operation 906 to operation 910, where the BMC 106 provides data identifying the location of the peripheral device firmware image 802 to the firmware driver 122. The BMC 106 also exposes the peripheral device firmware image 802 to the firmware driver 122 such as, for example, by exposing RMEDIA to the firmware driver 122 by way of the media service 604.

From operation 910, the routine 900 proceeds to operation 912, where the firmware driver 122 retrieves the peripheral device firmware image 802 from the BMC 106 and stores the peripheral device firmware image 802. The routine 900 then proceeds from operation 912 to operation 914, where the firmware update module 608 and a firmware device driver 806 update the firmware 804 of the peripheral device 808 using the updated peripheral device firmware 804A contained in the image 802. The firmware device driver 806 can be provided as a part of the firmware 104 or by the peripheral device 808. The routine 900 then proceeds from operation 908, where it ends.

Peripheral Device Firmware Update Using Rest Over IPMI Interface (Firmware Shell Utility)

Figure 10:
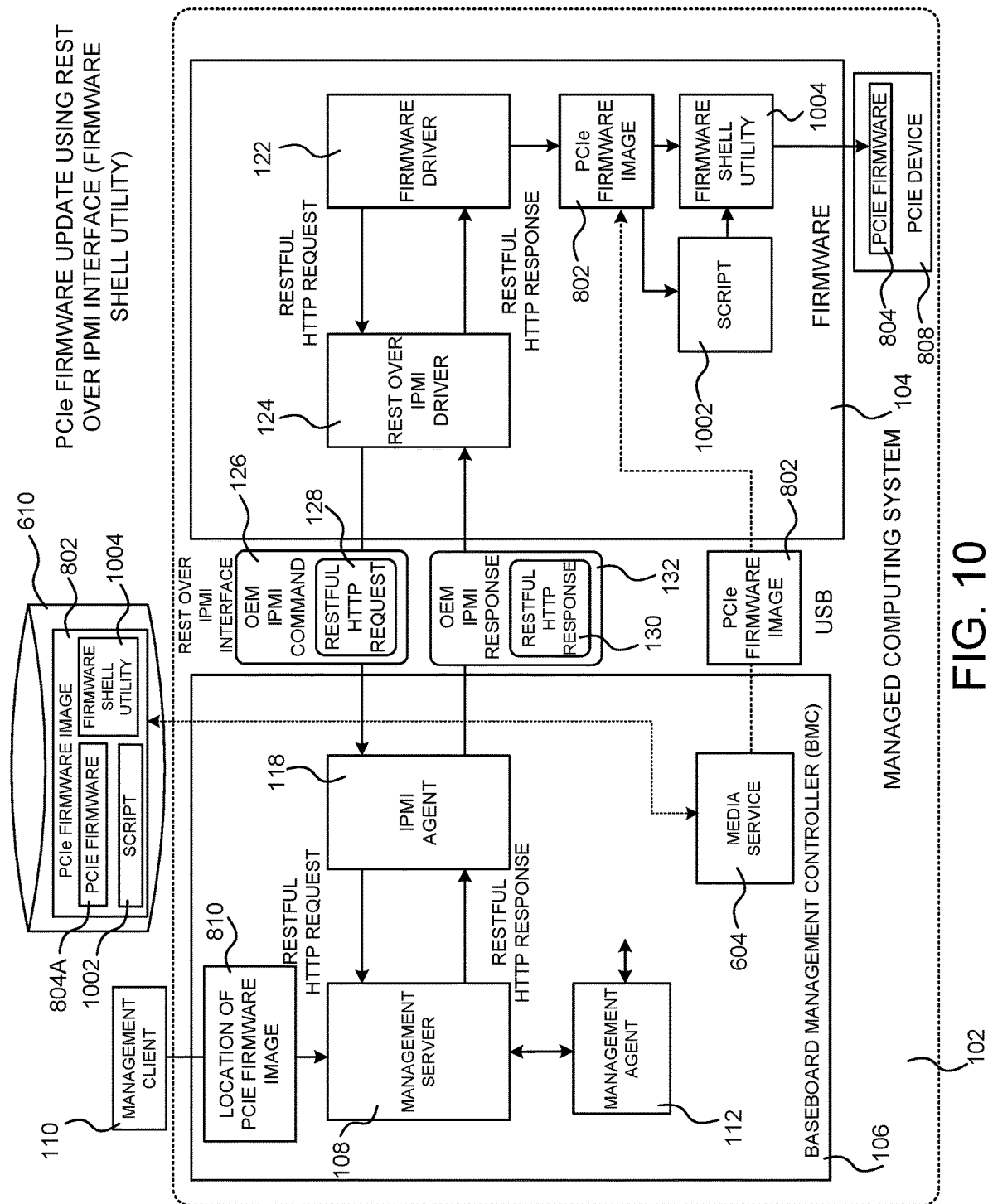
FIG. 10 is a software architecture diagram illustrating aspects of a mechanism for updating a firmware of a peripheral device utilizing a firmware shell utility and a REST over IPMI interface for firmware to BMC communication, according to one or more embodiments presented herein.

FIG. 10 is a software architecture diagram illustrating aspects of a mechanism for updating a firmware 804 of a peripheral device 808 utilizing a firmware shell utility 1004 and a REST over IPMI interface for firmware to BMC 106 communication, according to one or more embodiments presented herein. For example, the disclosed mechanism can be utilized to update a PCIe firmware of a PCIe device or a firmware in another type of peripheral device 808 using a firmware shell utility 1004.

In order to update the firmware 804 of a peripheral device 808 using a firmware shell utility 1004, the firmware driver 122 executing in the firmware of the managed computing system 102 transmits a request for a firmware update instruction for the peripheral device 808 to a BMC 106 over the REST over IPMI interface described above. As discussed above, the firmware update instruction for the peripheral device 808 includes data indicating whether the firmware 804 of the peripheral device 808 is to be updated. The BMC 106 receives the request and, in response to the request, provides data 810 to the firmware driver 122 identifying a location of a peripheral device firmware image 802 for the peripheral device 808 over the REST over IPMI interface. In this example, the firmware image 802 includes a firmware script 1002, a firmware shell utility 1004, and an updated peripheral device firmware 804A.

As in the example above, the firmware driver 122 utilizes the data 810 provided by the BMC 106 to retrieve the peripheral device firmware image 802 from the specified location. In some embodiments the BMC 106 stores and provides the peripheral device firmware image 802 such as, for example, by way of the media server 604. Once the peripheral device firmware image 802 has been retrieved, the firmware script 1002 is executed in a shell environment provided by the firmware 104 of the managed computing system 102. When executed, the firmware script 1002 executes the firmware shell utility 1004 in the shell environment. The firmware shell utility 1004, in turn, updates the firmware 804 of the peripheral device 808 using the updated peripheral device firmware 804A in the peripheral device firmware image 802.

As in the embodiments described above, the peripheral device firmware update instruction and the data identifying the location of the peripheral device firmware image 802 can be generated by placing non-standard data stored in a standard REDFISH property. The standard REDFISH property might, for example, be a property for identifying a location of a boot device of the managed computing system 102. Similarly, the data identifying the location of the peripheral device firmware image 802 and the firmware update request for the peripheral device 808 can be transmitted from the BMC 106 to the firmware driver 122 using OEM IPMI commands containing REST HTTP requests. As also in the embodiments described above, the data identifying the location of the peripheral device firmware image 802 can be expressed using a JSON format based on OData.

Figure 11:
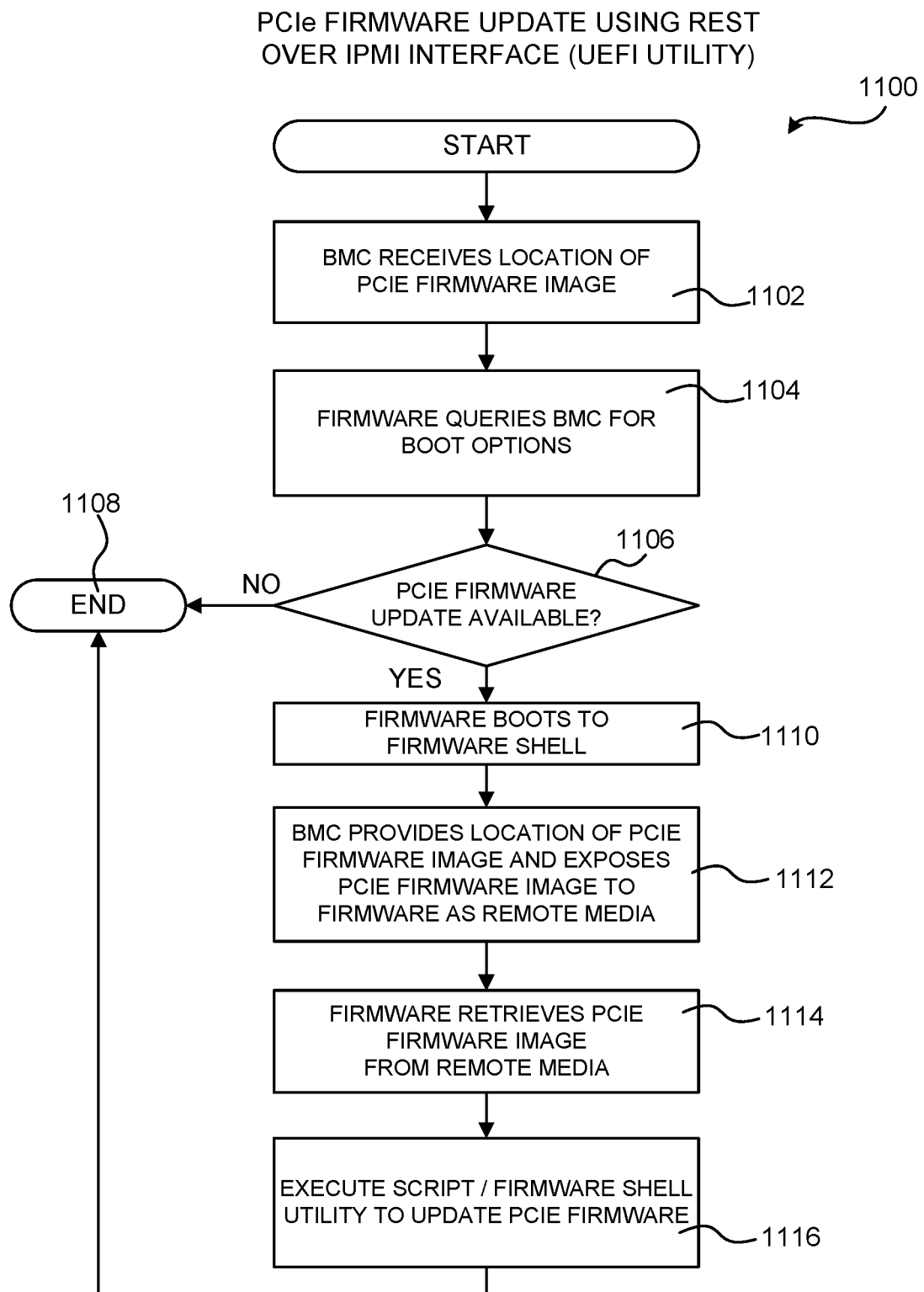
FIG. 11 is a flow diagram showing a routine that illustrates aspects of the operation of the managed computing system shown in FIG. 10 for updating a firmware of a peripheral device using a firmware shell utility and a REST over IPMI interface for firmware to BMC communication, according to one embodiment presented herein.

It is to be appreciated that while the embodiment discussed above with regard to FIG. 10, and further below with regard to FIG. 11, is primarily presented in the context of using a REST over IPMI interface for firmware to BMC communication, this embodiment can utilize other mechanisms for firmware to BMC communication. For example, and without limitation, the embodiment shown in FIG. 6 can utilize communication between the firmware 104 and the BMC 106 over a REST transport protocol on top of any available communication protocol, such as HTTP, MCTP, etc. including the IPMI. Accordingly, this embodiment is not limited to use with the REST over IPMI interface disclosed herein.

FIG. 11 is a flow diagram showing a routine 1100 that illustrates aspects of the operation of the managed computing system 102 shown in FIG. 10 for updating a firmware of a peripheral device 808 using a firmware shell utility 1004 and a REST over IPMI interface for firmware to BMC 106 communication, according to one embodiment presented herein. The routine 1100 begins at operation 1102, where the BMC 106 receives data 810 identifying the location of a peripheral device firmware image 802. As discussed above, a management client 110 can provide the data 810.

From operation 1102, the routine 1100 proceeds to operation 1104, where the firmware driver 122 queries the BMC 106 for boot options, including a peripheral device firmware update instruction. The routine 1100 then proceeds to operation 1106, where the firmware driver 122 determines whether the boot options indicate that the firmware 804 of the peripheral device 808 is to be updated. If the firmware 804 is not to be updated, the routine 1100 proceeds from operation 1106 to operation 1108, where it ends.

If the firmware 804 is to be updated, the routine 1100 proceeds from operation 1106 to operation 1110, where the firmware 104 boots to a shell environment. The routine 1100 then proceeds to operation 1112, where the BMC 106 provides the data 810 identifying the location of a peripheral device firmware image 802 to the firmware driver 122. The BMC 106 also exposes the peripheral device firmware image 802 to the firmware driver 122, such as by way of the media service 604.

From operation 1112, the routine 1100 proceeds to operation 1114, where the firmware driver 122 receives and stores the peripheral device firmware image 802. The routine 1100 then proceeds to operation 1116, where the script 1002 is executed in the shell environment. The script 1002, in turn, executes the firmware shell utility 1004 in the shell environment. The firmware shell utility 1004 then updates the firmware 804 of the peripheral device 808 with the firmware 804A stored in the peripheral device firmware image 802. The routine 1100 then proceeds from operation 1116 to operation 1108, where it ends.

Obtaining System Inventory Data Using Rest Over IPMI Interface

Figure 12:
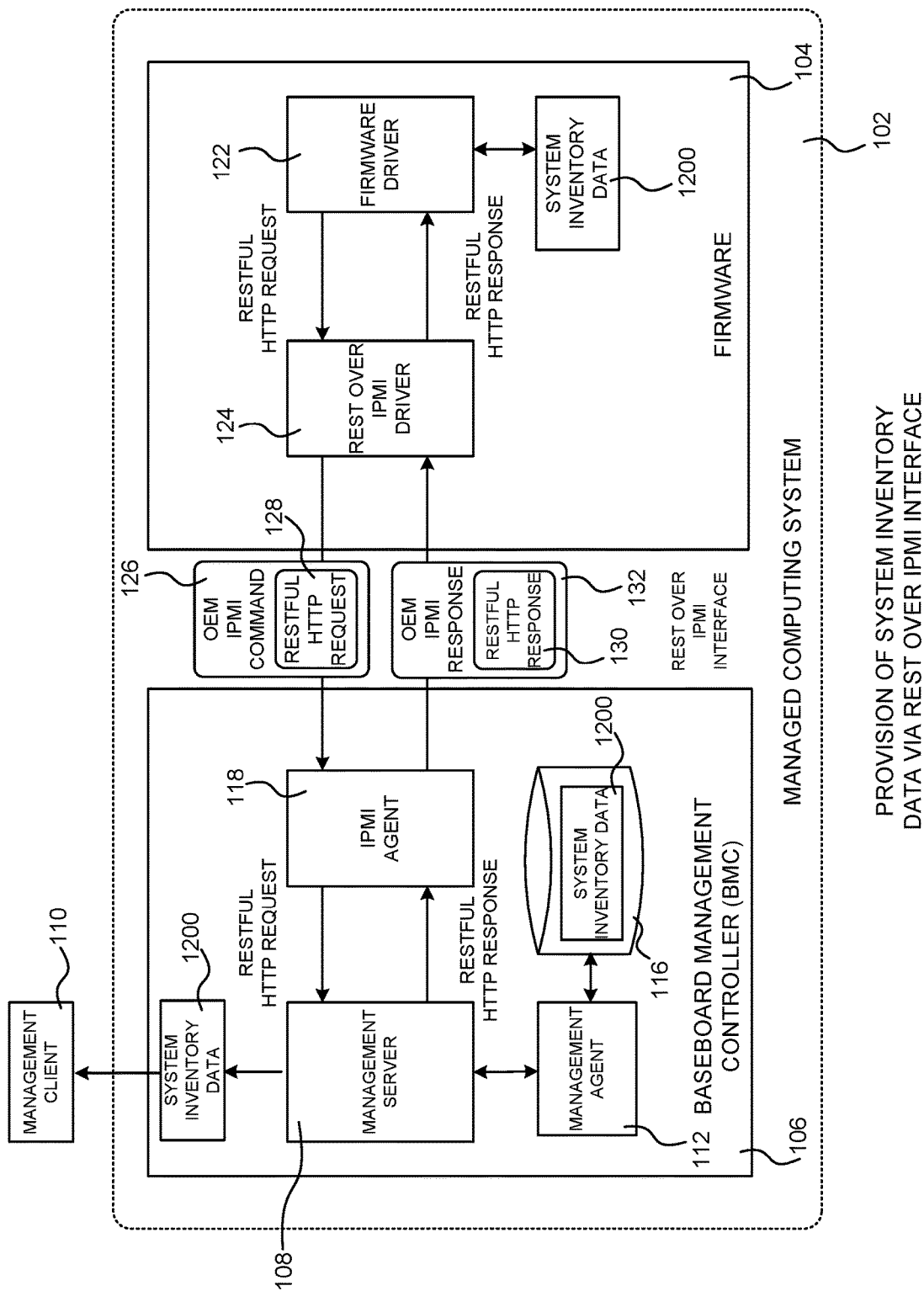
FIG. 12 is a software architecture diagram illustrating aspects of a mechanism for providing system inventory data from a firmware to a BMC utilizing a REST over IPMI interface for firmware to BMC communication, according to one or more embodiments presented herein.

FIG. 12 is a software architecture diagram illustrating aspects of a mechanism for providing system inventory data 1200 from a firmware 104 to a BMC 106 utilizing a REST over IPMI interface for firmware 104 to BMC 106 communication, according to one embodiment presented herein. In this embodiment, the firmware driver 122 obtains or generates system inventory data 1200 describing components of the managed computing system 102. The firmware driver 122 can, for example, obtain the system inventory data 1200 at a boot time of the computing system 102.

The firmware driver 122 generates a REST HTTP request 128 (e.g. an HTTP POST request) that includes the system inventory data 1200 to an interface exposed by a REST over IPMI driver 124, which also executes in the firmware 104. The REST over IPMI driver 124 receives the REST HTTP request 128 including the system inventory data 1200 from the firmware driver 122. In response thereto, the REST over IPMI driver 124 generates an OEM IPMI command 126 that encapsulates the REST HTTP request 128. The REST over IPMI driver 124 then provides the OEM IPMI command 126 to the BMC 106 of the computing system over the REST over IPMI interface.

As discussed above, the BMC 106 includes an IMPI agent 118 that receives the OEM IPMI command 126 from the REST over IPMI driver 124 executing in the firmware 104 of the computing system. In response thereto, the IMPI agent 118 retrieves the REST HTTP request 128 from the OEM IPMI command 126 and provides the REST HTTP request 128 to the interface exposed by a management server 108 executing in the BMC 106 (not shown in FIG. 12). As discussed above, the interface provided by the management server 108 can be implemented as a REDFISH-compatible REST interface provided over secure HTTPS that utilizes a JSON format that is based on OData in some embodiments disclosed herein. The management server 108 stores the system inventory data 1200 in an appropriate data store in the BMC 106.

The management server 108 also generates a REST HTTP response 130 to the REST HTTP request 128 such as, for example, a response including data indicating that the REST HTTP request 128 was successful. The management server 108 provides the REST HTTP response 130 to the interface exposed by the IMPI agent 118 executing in the BMC 106. The IMPI agent 118, in turn, receives the REST HTTP response 130 from the management server 108 and generates an OEM IPMI response 132 that includes the REST HTTP response 130. The IMPI agent 118 then provides the OEM IPMI response 132 that includes the REST HTTP response 130 to the REST over IPMI driver 124.

The IPMI driver receives the OEM IPMI response 132 that includes the REST HTTP response 130 from the IMPI agent 118. The REST over IPMI driver 124 then extracts the REST HTTP response 130 from the OEM IPMI response 132 received from the IMPI agent 118. The REST over IPMI driver 124 then provides the REST HTTP response 130 to an interface exposed by the firmware driver 122. In this manner, OEM IPMI commands 126 can be utilized to encapsulate RESTful HTTP requests including system inventory data 1200 and responses.

As discussed above, the management server 108 can also expose an interface, such as a REDFISH-compatible interface, through which management clients 110 can request the system inventory data 1200. In response to receiving such a request, the management server 108 can retrieve the requested system inventory data 1200 from the data store 116, and provide the system inventory data 1200 to the management client 110. The interface can be provided over an OOB network connection, for example.

Figure 13:
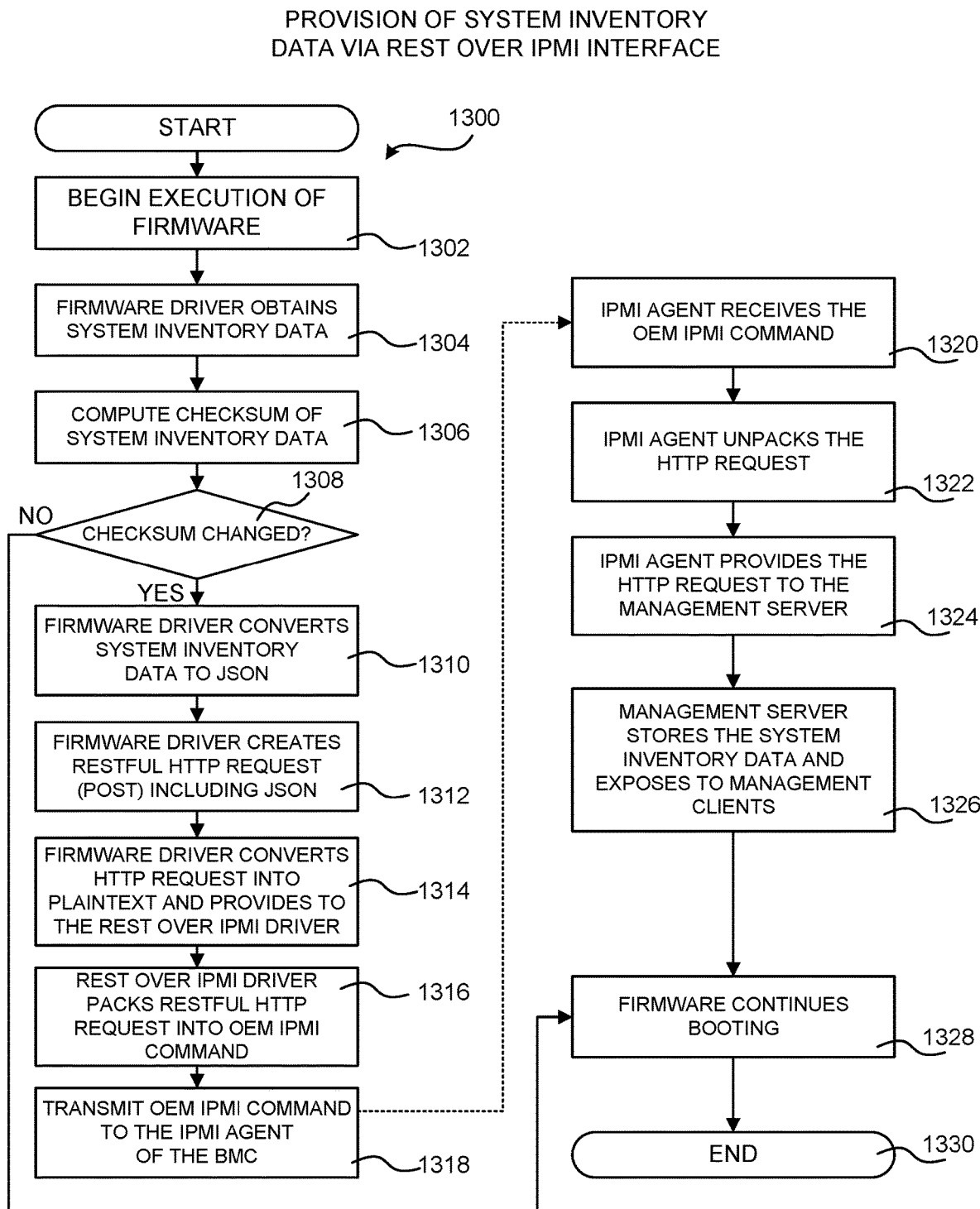
FIG. 13 is a flow diagram showing a routine that illustrates aspects of the operation of the managed computing system shown in FIG. 12 for providing system inventory data from a firmware to a BMC utilizing a REST over IPMI interface for firmware to BMC communication, according to one embodiment presented herein.

FIG. 13 is a flow diagram showing a routine 1300 that illustrates aspects of the operation of the managed computing system 102 shown in FIG. 12 for providing system inventory data 1200 from the firmware 104 to the BMC 106 utilizing the REST over IPMI interface for firmware 104 to BMC 106 communication, according to one embodiment presented herein. The routine 1300 begins at operation 1302, where the firmware 104 begins execution. The routine 1300 then proceeds to operation 1304, where the firmware driver 122 obtains or generates the system inventory data 1200 describing the components present in the managed computing system 102.

From operation 1304, the routine 1300 proceeds to operation 1306, where the firmware driver 122 can compute a checksum (e.g. CRC-32) for the system inventory data 1200. The routine 1300 then proceeds from operation 1306 to operation 1308, where the firmware driver 122 determines whether the checksum for the system inventory data 1200 is different than a previously stored checksum for the system inventory data 1200. If the checksums are the same, this indicates that the system inventory has not changed. In this case it is unnecessary to transmit the system inventory data 1200 to the BMC 106. Accordingly, in this case the routine 1300 proceeds from operation 1308 to operation 1328, where the firmware 104 continues execution. The routine 1300 proceeds from operation 1328 to operation 1330, where it ends.

If the checksums are different, this indicates that the system inventory has changed since a previous computation of the checksum. In this case the updated system inventory data 1200 is to be transmitted to the BMC 106. Accordingly, in this case the routine 1300 proceeds from operation 1308 to operation 1310, where the firmware driver 122 converts the system inventory data 1200 to JSON. The routine 1300 then proceeds to operation 1312, where the firmware driver 122 creates a REST HTTP request 128 including the JSON. The firmware driver 122 then converts the REST HTTP request 128 into plaintext and provides the plaintext REST HTTP request to the REST over IPMI driver 124 at operation 1314.

The routine 1300 then proceeds from operation 1314 to operation 1316 where the REST over IPMI driver 124 packs the plaintext REST HTTP request into an OEM IPMI command 126 in the manner described above. The REST over IPMI driver 124 transmits the OEM IPMI command 126 to the IPMI agent 118 of the BMC 106 at operation 1318. The IPMI agent 118 receives the OEM IPMI command 126 at operation 1320. The routine 1300 then proceeds from operation 1320 to operation 1322.

At operation 1322, the IPMI agent 118 unpacks the REST HTTP request 128 from the OEM IPMI command 126. The IPMI agent 118 then provides the REST HTTP request 128 including the system inventory data 1200 to the management server 108 at operation 1324. The management server 108 can then store the system inventory data 1200 in the REST HTTP request 128 in the data store 116 and expose the system inventory data 1200 to management clients 110 at operation 1326. The routine 1300 then proceeds to operations 1328 and 1330, described above.

Cloning of Firmware Configuration Settings Using Rest Over IPMI Interface

Figure 14:
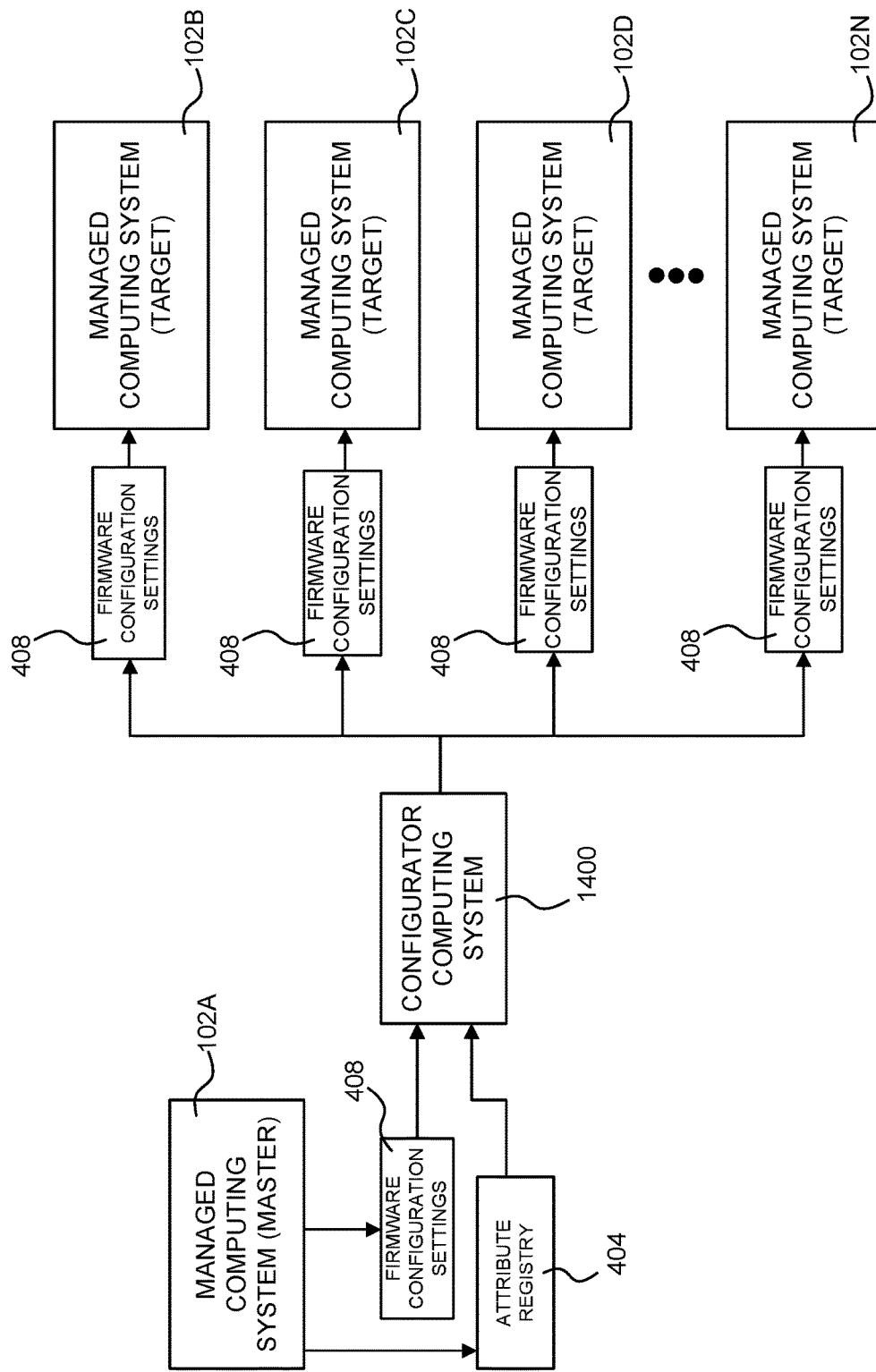
FIG. 14 is a network architecture diagram illustrating aspects of a mechanism for cloning and batch migration of firmware configuration settings utilizing a REST over IPMI interface, according to one or more embodiments presented herein.

FIG. 14 is a network architecture diagram illustrating aspects of a mechanism for cloning and batch migration of firmware configuration settings 408 utilizing a REST over IPMI interface, according to one or more embodiments presented herein In order to provide this functionality, a BMC 106 of a first computing system, referred to herein as a "master managed computing system 102A," obtains firmware configuration settings 408 from a firmware of the master managed computing system 102A utilizing a REST over IPMI interface such as that described above. As in the examples described above, the firmware configuration settings 408 can be obtained from the firmware of the master managed computing system 102A using OEM IPMI commands 126 containing REST HTTP requests 128. The BMC 106 of the master managed computing system 102A can also obtain the attribute registry 404 in a similar fashion.

As shown in FIG. 14, the BMC 106 of the master managed computing system 102A provides the firmware configuration settings 408 for the master managed computing system 102A to a second computing system, referred to herein as a "configurator computing system 1400." The BMC 106 might provide the firmware configuration settings 408 to the configurator computing system following a reboot of the master managed computing system 102A, for example.

The configurator computing system 1400 then provides the firmware configuration settings 408 to the BMCs 106 of one or more other computing systems, referred to herein as "target managed computing systems 102B-102N." The BMCs 106 of the target managed computing systems 102B-102N provide the firmware configuration settings 408 to the firmware 104 of the target managed computing systems 102B-102N using the REST over IPMI interface described above. As in the examples described above, the firmware configuration settings 408 can be obtained using OEM IPMI commands 126 containing REST HTTP requests 128. The configuration settings might be provided to the firmware 104 of the target managed computing systems 102B-102N following a reboot of the target managed computing systems 102B-102N. The firmware 104 of the target managed computing systems 102B-102N can then replace current firmware configuration settings with the firmware configuration settings 408 obtained from the master managed computing system 102A in the manner described above with regard to FIGS. 4, 5A, and 5B.

In some embodiments, the configurator computing system 1400 provides a UI (not shown in FIG. 14) that includes UI controls for receiving a network address of the BMC 106 of the master managed computing system 102A for obtaining the firmware configuration settings 408 and the attribute registry 404. The UI can also include UI controls for receiving network addresses of the BMCs 106 of the target managed computing systems 102B-102N. The UI can also receive credentials for use in accessing the BMCs 106 of the target managed computing systems 102B-102N to provide the firmware configuration settings 408 for use in configuring the firmware 104 of the target managed computing systems 102B-102N.

Figure 15:
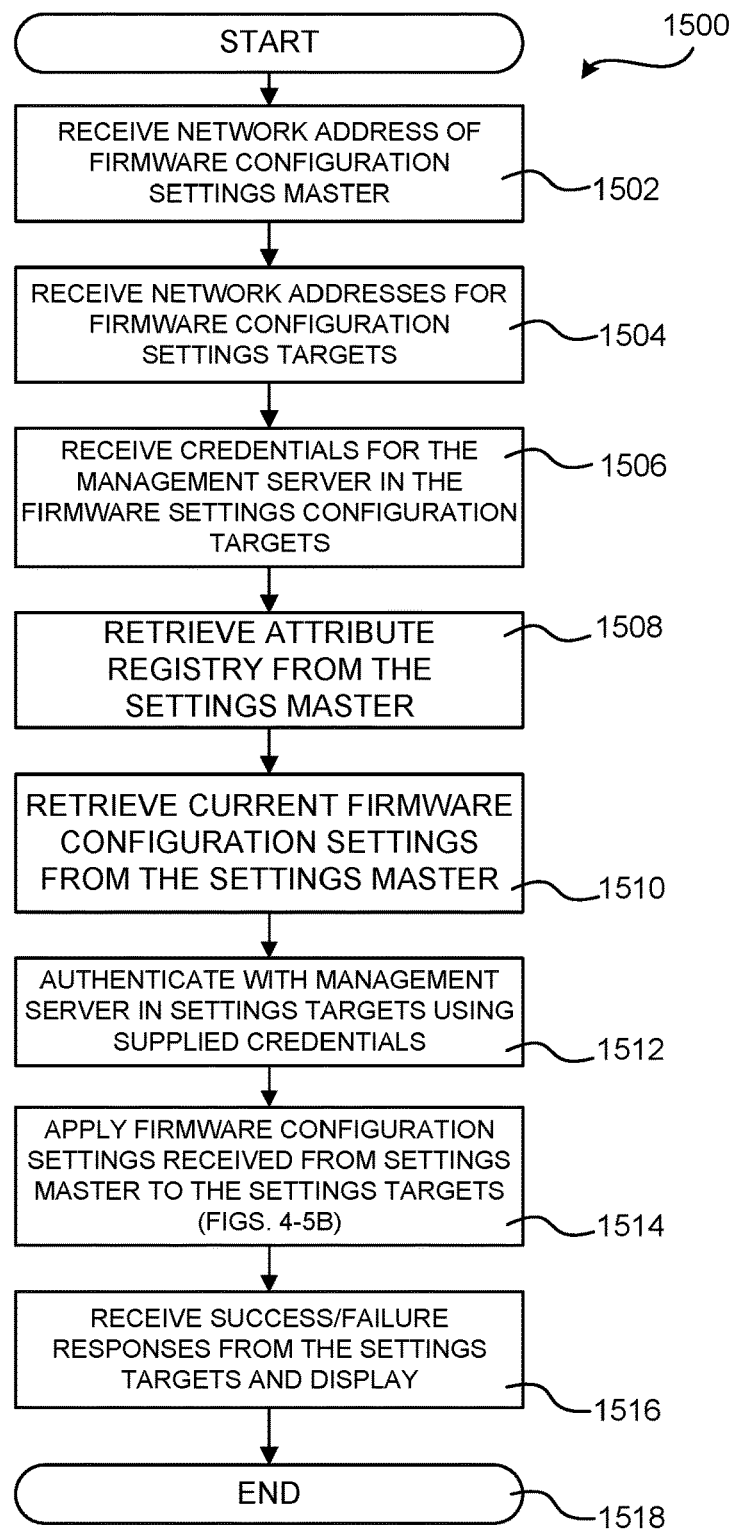
FIG. 15 is a flow diagram showing a routine that illustrates aspects of the operation of the managed computing system shown in FIG. 14 for cloning and batch migration of firmware configuration settings utilizing a REST over IPMI interface, according to one embodiment presented herein.

FIG. 15 is a flow diagram showing a routine 1500 that illustrates aspects of the operation of the managed computing system 102 shown in FIG. 14 for cloning and batch migration of firmware configuration settings 408 utilizing a REST over IPMI interface, according to one embodiment presented herein. The routine 1500 begins at operation 1502, where a configurator computing system 1400 receives a network address of the BMC 106 of a master managed computing system 102A. The routine 1500 then proceeds to operation 1504, where the configurator computing system 1400 receives network addresses of the BMCs 106 of the target managed computing systems 102B-102N that are to have firmware configuration settings 408 applied thereto. The routine 1500 then continues to operation 1506, where the configurator computing system 1400 receives credentials, such as a login and password, for the BMCs 106 of the target managed computing systems 102B-102N. As discussed above, the configurator computing system 1400 can provide a UI for receiving this information in some configurations.

From operation 1506, the routine 1500 proceeds to operation 1508, where the configurator computing system 1400 obtains the attribute registry 404 from the BMC 106 of the master managed computing system 102A. Similarly, the configurator computing system 1400 obtains the current firmware configuration settings 408 of the master managed computing system 102A from the BMC 106 of the master managed computing system 102A at operation 1510. The routine 1500 then proceeds from operation 1510 to operation 1512.

At operation 1512, the configurator computing system 1400 authenticates with the management server 108 in the target managed computing systems 102B-102N utilizing the credentials received at operation 1506. Once authenticated, the configurator computing system 1400 provides the current firmware configuration settings 408 of the master managed computing system 102A to the BMCs 106 of the target managed computing systems 102B-102N. The current firmware configuration settings 408 are then applied to the target managed computing systems 102B-102N in the manner described above with regard to FIGS. 4, 5A, and 5B. At operation 1516 success and/or failure responses can be returned by the target managed computing systems 102B-102N and presented in a UI or in another manner by the configurator computing system 1400. The routine 1500 then proceeds from operation 1516 to operation 1518, where it ends.

Secure Firmware Integrity Monitoring Using Rest Over IPMI Interface

Figure 16:
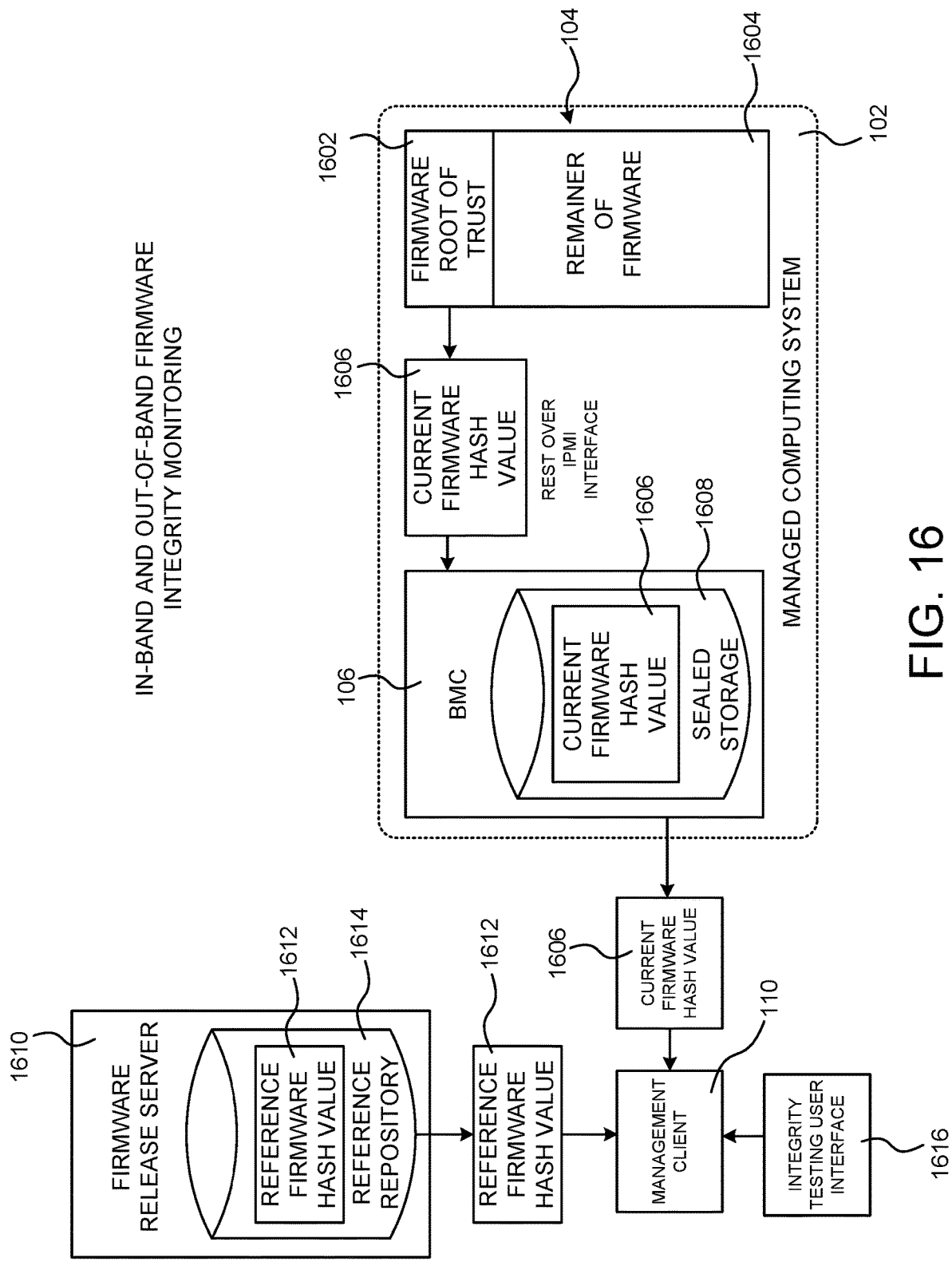
FIG. 16 is a software architecture diagram illustrating aspects of a mechanism for in-band and out-of-band firmware integrity monitoring utilizing a REST over IPMI interface for firmware to BMC communication, according to one or more embodiments presented herein.
Figure 17A:
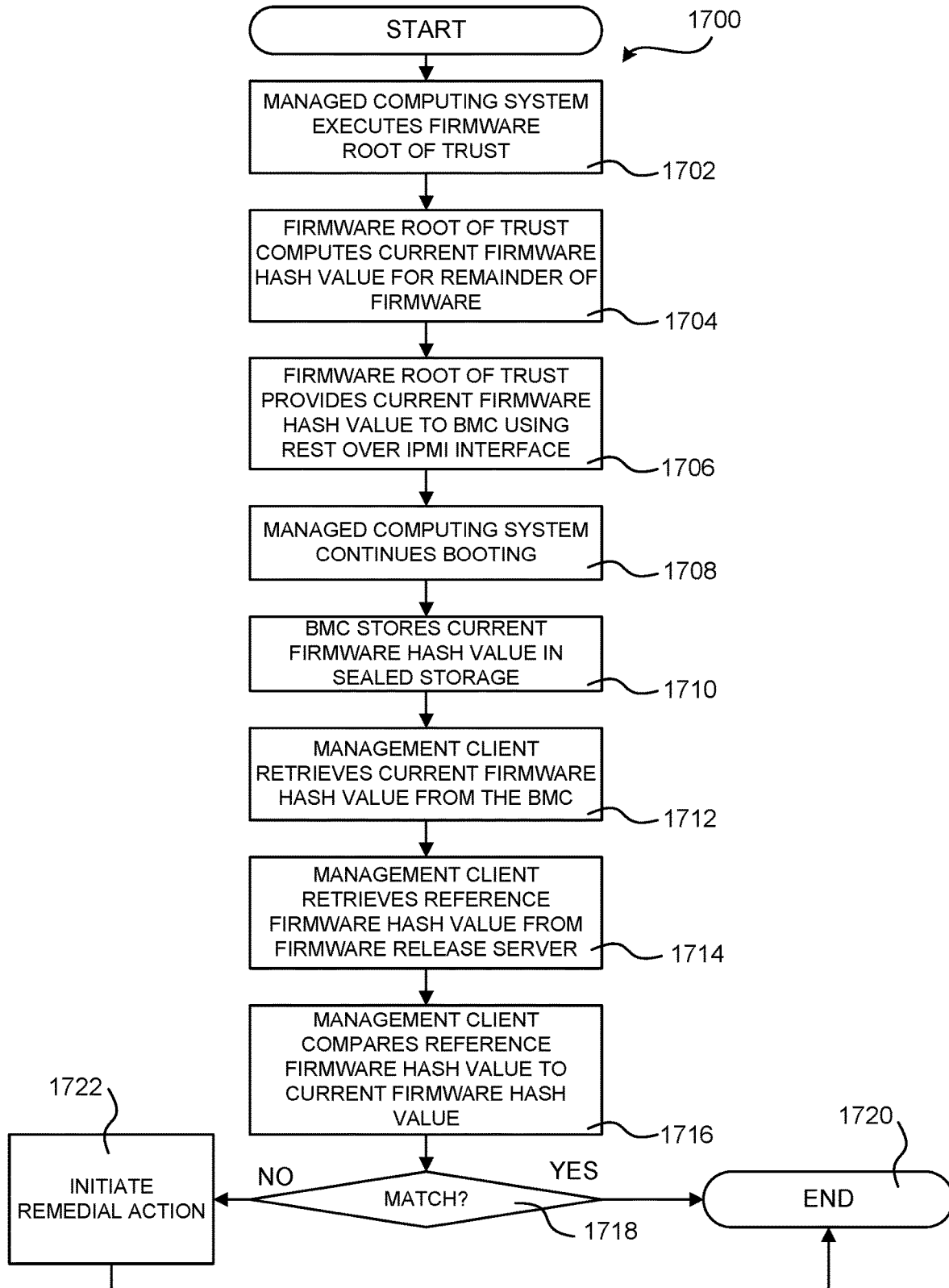
FIGS. 17A and 17B are flow diagrams showing routines that illustrate aspects of the operation of the managed computing system shown in FIG. 16 for in-band and out-of-band firmware integrity monitoring utilizing a REST over IPMI interface for firmware to BMC communication, according to one embodiment presented herein.
Figure 17B:
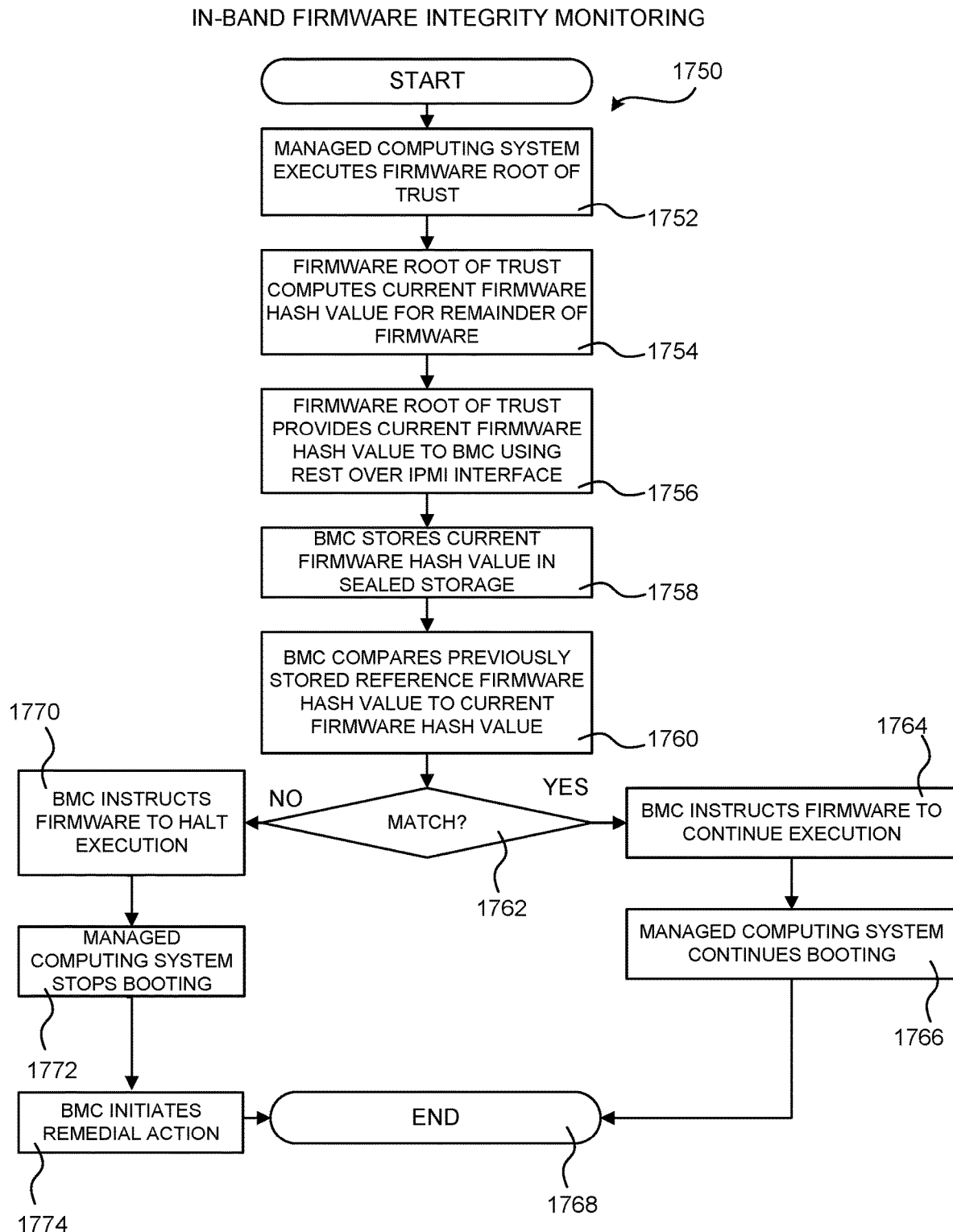

The REST over IPMI interface described above is utilized in one embodiment to facilitate monitoring of the integrity of a firmware 104 of a managed computing system 102. One embodiment, described with reference to FIGS. 16 and 17A, provides a mechanism for OOB firmware integrity monitoring. Another embodiment, described with reference to FIGS. 16 and 17B, provides a mechanism for in-band firmware integrity monitoring. In these embodiments, communication between a firmware 104 and a BMC 106 can be performed using the REST over IPMI interface described above to facilitate monitoring of the integrity of the firmware 104 and the initiation of remedial action in the event that the firmware 104 is compromised.

In order to implement OOB firmware integrity monitoring, a managed computing system 102 executes a firmware root of trust 1602 at boot time of the managed computing system 102. The firmware root of trust 1602 is a portion of the firmware 104 that is executed immediately following power on of the managed computing system 102. The firmware root of trust 1602 cannot be modified.

The firmware root of trust 1602 computes a current firmware hash value 1606 for another portion of the firmware 104 (e.g. the remainder 1604 of the firmware 104), and provides the current firmware hash value 1606 to the BMC 106 of the managed computing system 102 using the REST over IPMI interface described above. The current firmware hash value 1606 can be computed at boot time of the managed computing system 102. The BMC 106 of the managed computing system 102 stores the current firmware hash value 1606 in a secure storage location, such as sealed storage. The managed computing system 102 then continues execution of the remainder 1604 of the firmware 104.

A management client 110 retrieves the current firmware hash value 1606 from a management interface (e.g. a REDFISH interface) provided by the BMC 106 of the managed computing system 102. The management client 110 also retrieves a reference hash value 1612 for the firmware 104 from a reference repository 1614 of a server computer, which might be referred to herein as a "firmware release server 1610." The reference hash value 1612 is a hash value computed at the time the firmware 104 is created, or built, for the same portion of firmware 104 (e.g. the remainder 1604 of the firmware 104) for which the firmware root of trust 1602 computes the hash value. In other embodiments, the BMC stores the reference hash value in sealed storage. The reference hash value can be stored in the BMC at the time the firmware is being updated and retrieved by the BMC in order to compare the reference hash value to the current hash value. In some embodiments, the management client 110 provides an integrity testing UI 1616 through which a user can specify the network address of the BMC 106 of the managed computing system 102, the network address of the firmware release server 1610, and/or other information.

The management client 110 compares the current firmware hash value 1606 to the reference hash value 1612. If the current firmware hash value 1606 and the reference hash value 1612 are the same, the firmware 104 is deemed to be valid and, therefore, no action is taken. If, however, the current firmware hash value 1606 and the reference hash value 1612 are different, the firmware 104 is deemed to be invalid, and the management client 110 initiates an update of the firmware 104. In some embodiments, one of the mechanisms described above for updating a firmware 104 is utilized. In other embodiments, the BMC 106 of the managed computing system 102 performs the update of the firmware 104 directly.

In order to implement in-band firmware integrity monitoring, the managed computing system 102 executes the firmware root of trust 1602 at boot time. The firmware root of trust 1602 computes a current firmware hash value 1606 for another portion of the firmware 104 (e.g. the remainder 1604 of the firmware 104) and provides the current firmware hash value 1606 to the BMC 106 of the managed computing system 102 using the REST over IPMI interface described above. The current firmware hash value 1606 can be computed at boot time of the managed computing system 102. The BMC 106 of the managed computing system 102 stores the current firmware hash value 1606 in a secure storage location, such as sealed storage. The managed computing system 102 does not, however, continue execution of the remainder 1604 of the firmware 104 at this time. Rather, the managed computing system 102 pauses execution of the firmware 104.

In this embodiment, the BMC 106 of the managed computing system 102 retrieves the reference hash value 1612 for the firmware 104 from the firmware release server 1610. The BMC 106 compares the current firmware hash value 1606 to the reference hash value 1612. If the current firmware hash value 1606 and the reference hash value 1612 are the same, the firmware 104 is deemed to be valid. In this case, the BMC 106 instructs the firmware 104 of the managed computing system 102 to continue execution. This instruction can be provided using the REST over IPMI mechanism described above.

If, however, the current firmware hash value 1606 and the reference hash value 1612 are different, the firmware 104 is deemed to be invalid, and the BMC 106 instructs the firmware 104 of the managed computed system to halt execution, thereby preventing execution of the remainder of the firmware 104. The BMC 106 can then initiate remedial action, such as updating the firmware 104 of the managed computing system 102. The BMC 106 of the managed computing system 102 performs the firmware update directly in some embodiments.

It is to be appreciated that while the embodiment discussed above with regard to FIG. 16, and further below with regard to FIGS. 17A and 17B, is primarily presented in the context of using a REST over IPMI interface for firmware to BMC communication, this embodiment can utilize other mechanisms for firmware to BMC communication. For example, and without limitation, the embodiment shown in FIG. 6 can utilize communication between the firmware 104 and the BMC 106 over a REST transport protocol on top of any available communication protocol, such as HTTP, MCTP, etc. including the IPMI. Accordingly, this embodiment is not limited to use with the REST over IPMI interface disclosed herein FIGS. 17A and 17B are flow diagrams showing routines 1700 and 1750, respectively, that illustrate aspects of the operation of the managed computing system 102 shown in FIG. 16 for OOB and in-band firmware integrity monitoring utilizing a REST over IPMI interface for firmware to BMC 106 communication, according to one embodiment presented herein. The routine 1700 begins at operation 1702, where the managed computing system 1702 is powered on or is rebooted and begins executing the firmware root of trust 1602. From operation 1702, the routine 1700 proceeds to operation 1704, where the firmware root of trust 1602 computes the current firmware hash value 1606 for the remainder 1604 of the firmware 104.

The routine 1700 then proceeds from operation 1704 to operation 1706, where the firmware root of trust 1602 provides the current firmware hash value 1606 to the BMC 106 using the REST over IPMI interface described above. The managed computing system 102 then continues booting in a normal fashion at operation 1708.

At operation 1710, the BMC 106 stores the current firmware hash value 1606 in a secure location, such as sealed storage. The routine 1700 then continues from operation 1710 to operation 1712, where the management client 110 retrieves the current firmware hash value 1606 from the BMC 106 of the managed computing system 102. The management client 110 also retrieves the reference firmware hash value 1612 from the firmware release server 1610 or from sealed storage of the BMC at operation 1714.

From operation 1714, the routine 1700 proceeds to operation 1716, where the management client 110 determines whether the current firmware hash value 1606 and the reference firmware hash value 1612 are the same. If the current firmware hash value 1606 and the reference firmware hash value 1612 are the same at operation 1718, this indicates that the integrity of the firmware 104 has not been compromised and, therefore, no action is taken. In this case, the routine 1700 proceeds from operation 1718 to operation 1720, where it ends.

If, however, the management client 102 determines that the current firmware hash value 1606 and the reference firmware hash value 1612 are different, this indicates that the integrity of the firmware 104 has been compromised. In this case, the routine 1700 proceeds from operation 1718 to operation 1722, where remedial action can be initiated such as, but not limited to, updating the firmware 104 of the managed computing system 102 in the manner described above. The routine 1700 then proceeds from operation 1722 to operation 1720, where it ends.

The routine 1750 begins at operation 1752, where the managed computing system 1702 is powered on or is rebooted and begins executing the firmware root of trust 1602. From operation 1752, the routine 1750 proceeds to operation 1754, where the firmware root of trust 1602 computes the current firmware hash value 1606 for the remainder 1604 of the firmware 104.

The routine 1750 then proceeds from operation 1754 to operation 1756, where the firmware root of trust 1602 provides the current firmware hash value 1606 to the BMC 106 using the REST over IPMI interface described above. The firmware 104 of the managed computing system 102 then pauses execution.

At operation 1758, the BMC 106 stores the current firmware hash value 1606 in a secure location, such as sealed storage. The routine 1750 then continues from operation 1758 to operation 1760, where the management client 110 determines whether the current firmware hash value 1606 and a previously obtained and stored reference firmware hash value 1612 for the firmware 104 are the same. If the current firmware hash value 1606 and the reference firmware hash value 1612 are the same at operation 1762, this indicates that the integrity of the firmware 104 has not been compromised and, therefore, no action is taken. In this case, the routine 1750 proceeds from operation 1762 to operation 1764, where the BMC 106 instructs the firmware 104 to continue execution. The routine 1750 then continues to operation 1766, where the managed computing system 102 continues booting in a normal fashion. The routine 1750 then proceeds from operation 1766 to operation 1768, where it ends.

If, however, the management client 102 determines that the current firmware hash value 1606 and the reference firmware hash value 1612 are the different, this indicates that the integrity of the firmware 104 has been compromised. In this case, the routine 1750 proceeds from operation 1762 to operation 1770, where the BMC 106 instructs the firmware 104 to halt execution. In response thereto, the managed computing system 102 stops booting at operation 1772. Additionally, the BMC 106 can initiate remedial action at operation 1774 such as, but not limited to, updating the firmware 104 of the managed computing system 102 in the manner described above. The routine 1750 then proceeds from operation 1774 to operation 1768, where it ends.

Figure 18:
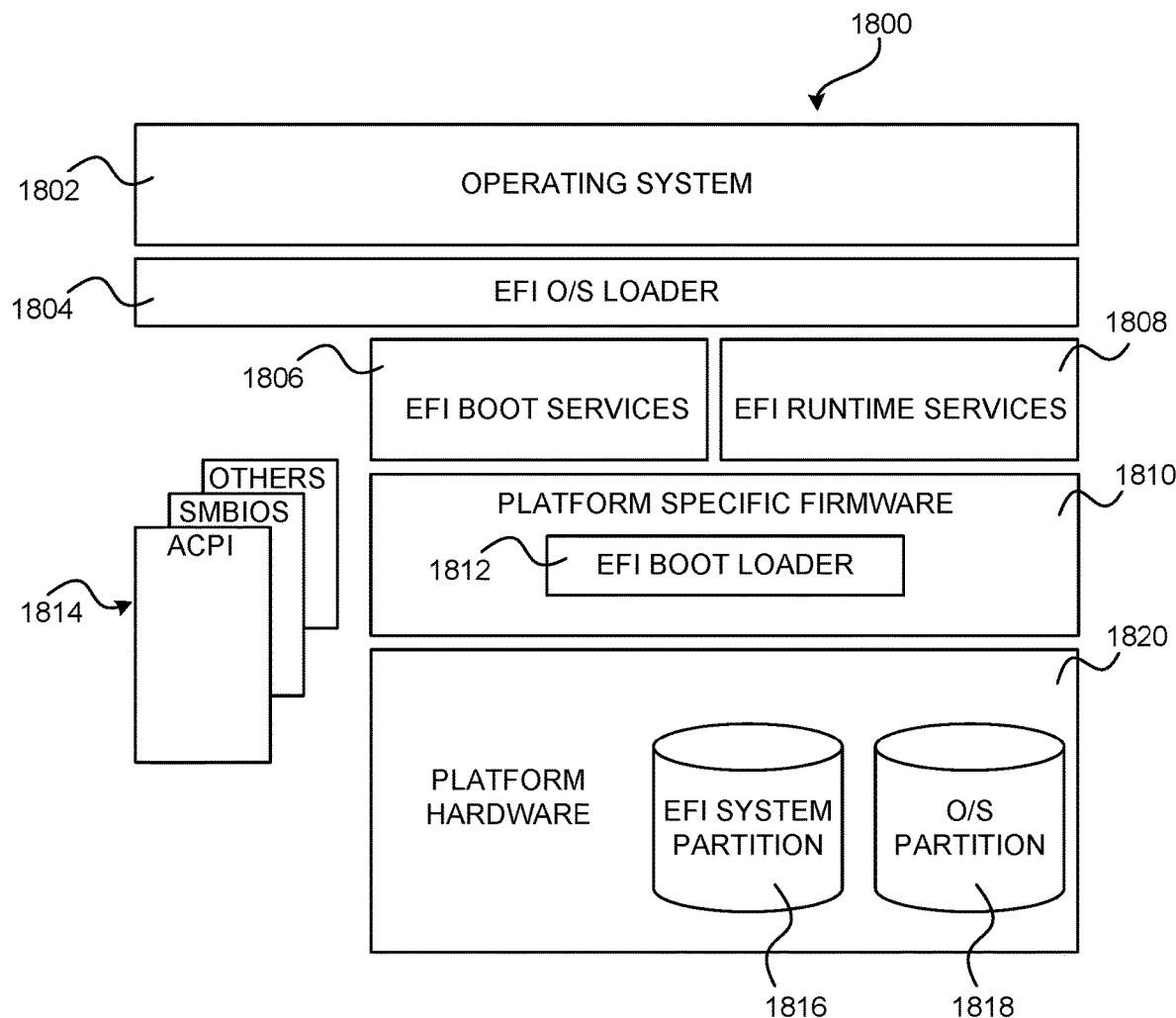
FIG. 18 is a software architecture diagram illustrating a software architecture for a unified extensible firmware interface ("UEFI")-compliant firmware that provides an operating environment for aspects of the technologies presented herein in one embodiment.

Turning now to FIG. 18, a software architecture diagram will be described that illustrates an architecture for a Unified Extensible Firmware Interface ("UEFI") Specification-compliant firmware 1800 that can be configured to provide and/or utilize aspects of the technologies disclosed herein. In particular, the firmware architecture shown in FIG. 18 can be utilized to implement the firmware 104 described above. The firmware 104 can also be implemented in other ways in other configurations.

The UEFI Specification describes an interface between an operating system 1802 and a UEFI Specification-compliant firmware 1800. The UEFI Specification also defines an interface that a firmware 1800 can implement, and an interface that an operating system 1802 (which might be referred to herein as an "OS") can use while booting. How a firmware implements the interface can be left up to the manufacturer of the firmware. The UEFI Specification also defines a way for an operating system 1802 and a firmware 1800 to exchange information necessary to support the operating system boot process. The term "UEFI Specification" used herein refers to both the EFI Specification developed by INTEL CORPORATION and the UEFI Specification managed by the UEFI FORUM.

As shown in FIG. 18, the architecture can include platform hardware 1820, such as that described below with regard to FIG. 19, and an operating system 1802. A boot loader 1812 for the operating system 1802 can be retrieved from the UEFI system partition 1816 using a UEFI operating system loader 1804. The UEFI system partition 1816 can be an architecturally shareable system partition. As such, the UEFI system partition 1816 can define a partition and file system designed to support safe sharing of mass storage between multiple vendors. An OS partition 1818 can also be utilized.

Once started, the UEFI OS loader 1804 can continue to boot the complete operating system 1802. In doing so, the UEFI OS loader 1804 can use UEFI boot services 1806, an interface to other supported specifications to survey, comprehend, and initialize the various platform components and the operating system software that manages them. Thus, interfaces 1814 from other specifications can also be present on the system. For example, the ACPI and the System Management BIOS ("SMBIOS") specifications can be supported.

UEFI boot services 1806 can provide interfaces for devices and system functionality used during boot time. UEFI runtime services 1808 can also be available to the UEFI OS loader 1804 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 1802 and system firmware 1800, the Framework is a group of specifications that together describe a firmware implementation that has been designed to perform the full range of operations that are required to initialize a platform from power on through transfer of control to the operating system 1802. The specifications that make up the Framework, which are also available from INTEL CORPORATION, are also expressly incorporated herein by reference.

Figure 19:
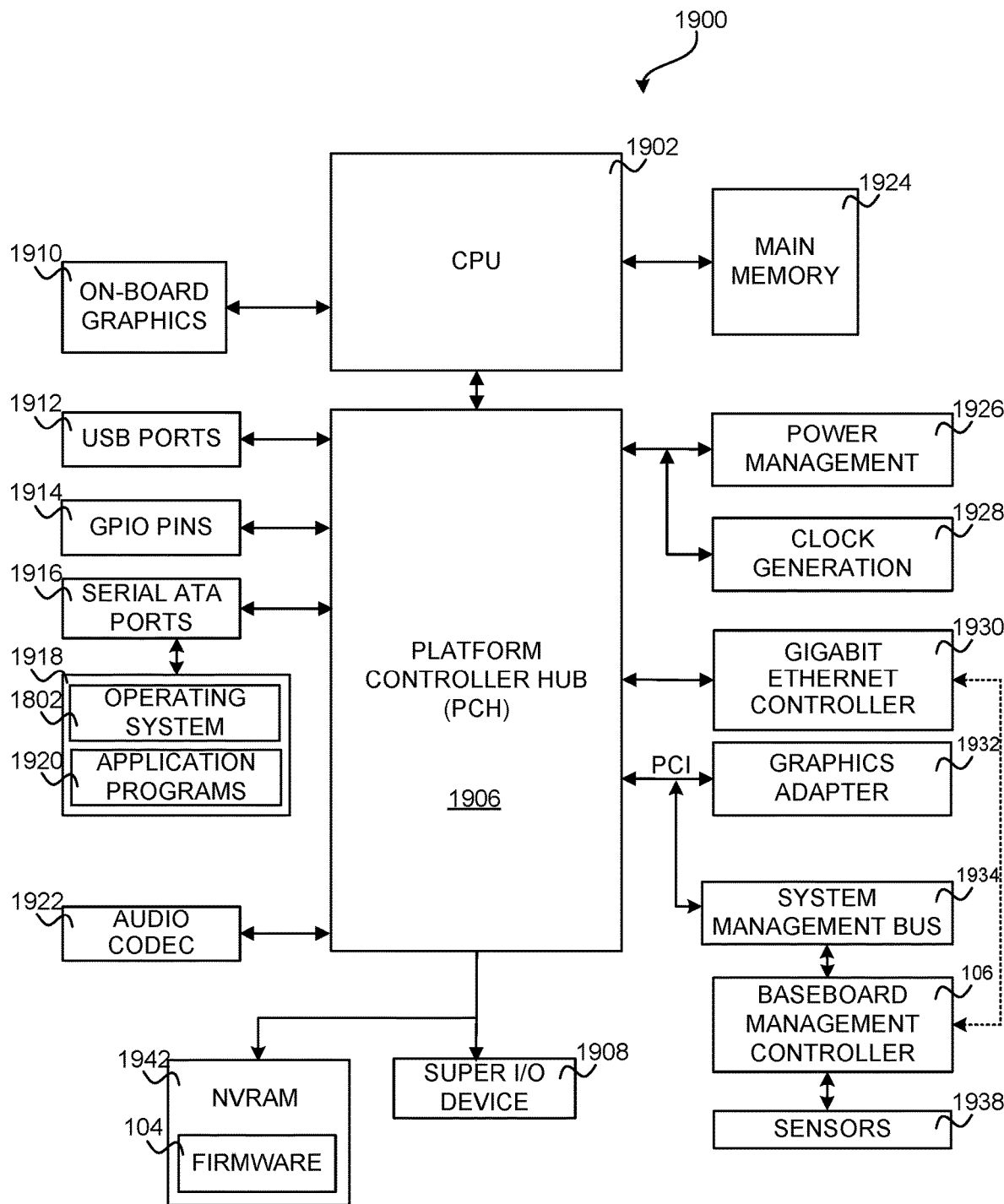
FIG. 19 is a computer architecture diagram that shows an illustrative architecture for a computer that can implement the technologies disclosed herein.

Referring now to FIG. 19, a computer architecture diagram that shows an illustrative architecture for a computer that can provide an operating environment for the technologies presented herein will be described. For example, and without limitation, the computer architecture shown in FIG. 19 can be utilized to implement the managed computing system 102 and/or any of the other computing systems disclosed herein.

FIG. 19 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 19 shows an illustrative computer architecture for a computer 1900 that can be utilized in the implementations described herein. The illustrative computer architecture shown in FIG. 19 is for the computer 1900, and includes a baseboard, or "motherboard", which is a printed circuit board to which a multitude of components or devices can be connected by way of a system bus or other electrical communication path. In one illustrative configuration, a central processing unit ("CPU") 1902 operates in conjunction with a Platform Controller Hub ("PCH") 1906. The CPU 1902 is a central processor that performs arithmetic and logical operations necessary for the operation of the computer 1900. The computer 1900 can include a multitude of CPUs 1902. Each CPU 1902 might include multiple processing cores.

The CPU 1902 provides an interface to a random access memory ("RAM") used as the main memory 1924 in the computer 1900 and, possibly, to an on-board graphics adapter 1910. The PCH 1906 provides an interface between the CPU 1902 and the remainder of the computer 1900.

The PCH 1906 can also be responsible for controlling many of the input/output functions of the computer 1900. In particular, the PCH 1906 can provide one or more universal serial bus ("USB") ports 1912, an audio codec 1922, a Gigabit Ethernet Controller 1930, and one or more general purpose input/output ("GPIO") pins 1914. The USB ports 1912 can include USB 2.0 ports, USB 3.0 ports and USB 3.1 ports among other USB ports. The audio codec 1922 can include Intel High Definition Audio, Audio Codec '97 ("AC'97") and Dolby TrueHD among others.

The PCH 1906 can also include functionality for providing networking functionality through a Gigabit Ethernet Controller 1930. The Gigabit Ethernet Controller 1930 is capable of connecting the computer 1900 to another computer via a network. Connections which can be made by the Gigabit Ethernet Controller 1930 can include LAN or WAN connections. LAN and WAN networking environments are commonplace in offices, enterprise-wide computer networks, intranets, and the Internet.

The PCH 1906 can also provide a bus for interfacing peripheral card devices such as a graphics adapter 1932. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 1906 can also provide a system management bus 1934 for use in managing the various components of the computer 1900. Additional details regarding the operation of the system management bus 1934 and its connected components are provided below. Power management circuitry 1926 and clock generation circuitry 1928 can also be utilized during the operation of the PCH 1906.

The PCH 1906 is also configured to provide one or more interfaces for connecting mass storage devices to the computer 1900. For instance, according to one configuration, the PCH 1906 includes a serial advanced technology attachment ("SATA") adapter for providing one or more serial ATA ports 1916. The serial ATA ports 1916 can be connected to one or more mass storage devices storing an OS, such as OS 1802 and application programs 1920, such as a SATA disk drive 1918. As known to those skilled in the art, an OS 1802 comprises a set of programs that control operations of a computer and allocation of resources. An application program is software that runs on top of the operating system 1802, or other runtime environment, and uses computer resources to perform application specific tasks desired by the user.

According to one configuration, the OS 1802 comprises the LINUX operating system. According to another configuration, the OS 1802 comprises the WINDOWS operating system from MICROSOFT CORPORATION. According to another configuration, the OS 1802 comprises the UNIX operating system or one of its variants. It should be appreciated that other operating systems can also be utilized.

The mass storage devices connected to the PCH 1906, and their associated computer-readable storage media, provide non-volatile storage for the computer 1900. Although the description of computer-readable storage media contained herein refers to a mass storage device, such as a hard disk or CD-ROM drive, it should be appreciated by those skilled in the art that computer-readable storage media can be any available media that can be accessed by the computer 1900.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 1900.

A low pin count ("LPC") interface can also be provided by the PCH 1906 for connecting a Super I/O device 1908. The Super I/O device 1908 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 1942 for storing firmware 104 that includes program code containing the basic routines that help to start up the computer 1900 and to transfer information between elements within the computer 1900 as discussed above with regard to FIG. 18.

It should be appreciated that the program modules disclosed herein, including the firmware 104, can include software instructions that, when loaded into the CPU 1902 and executed, transform a general-purpose computer 1900 into a special-purpose computer 1900 customized to facilitate all, or part of, the operations disclosed herein. As detailed throughout this description, the program modules can provide various tools or techniques by which the computer 1900 can participate within the overall systems or operating environments using the components, logic flows, and/or data structures discussed herein.

The CPU 1902 can be constructed from any number of transistors or other circuit elements, which can individually or collectively assume any number of states. More specifically, the CPU 1902 can operate as a state machine or finite-state machine. Such a machine can be transformed to a second machine, or a specific machine, by loading executable instructions contained within the program modules. These computer-executable instructions can transform the CPU 1902 by specifying how the CPU 1902 transitions between states, thereby transforming the transistors or other circuit elements constituting the CPU 1902 from a first machine to a second machine, wherein the second machine can be specifically configured to perform the operations disclosed herein. The states of either machine can also be transformed by receiving input from one or more user input devices, network interfaces (such as the Gigabit Ethernet Controller 1930), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 1924 and/or NVRAM 1942. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 1906 can include a system management bus 1934. As discussed above, when utilized to implement the managed computing system 102, the system management bus 1934 can include a BMC 106. As discussed above, the BMC 106 is a microcontroller that monitors operation of the computer 1900. In a more specific configuration, the BMC 106 monitors health-related aspects associated with the computer 1900, such as, but not limited to, the temperature of one or more components of the computer 1900, speed of rotational components (e.g., spindle motor, CPU fan, etc.) within the computer 1900, the voltage across or applied to one or more components within the computer 1900, and the available and/or used capacity of memory devices within the computer 1900. To accomplish these monitoring functions, the BMC 106 is communicatively connected to one or more components by way of the system management bus 1934 in some configurations.

In one configuration, these components include sensor devices 1938 for measuring various operating and performance-related parameters within the computer 1900. The sensor devices 1938 can be either hardware or software based components configured or programmed to measure or detect one or more of the various operating and performance-related parameters.

The BMC 106 functions as the master on the system management bus 1934 in most circumstances, but can also function as either a master or a slave in other circumstances. Each of the various components communicatively connected to the BMC 106 by way of the system management bus 1934 is addressed using a slave address. The system management bus 1934 is used by the BMC 106 to request and/or receive various operating and performance-related parameters from one or more components, such as the firmware 104, which are also communicatively connected to the system management bus 1934.

It should be appreciated that the functionality provided by the computer 1900 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 1900 might not include all the components shown in FIG. 19, can include other components that are not explicitly shown in FIG. 19, or might utilize an architecture completely different than that shown in FIG. 19.

Based on the foregoing, it should be appreciated that technologies for providing a REST over IPMI interface for firmware to BMC communication and applications therefore have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method for updating a firmware of a peripheral device of a computing system, comprising:
   transmitting a request for a firmware update instruction for the peripheral device from a firmware of the computing system to a baseboard management controller (BMC) over a representational state transfer (REST) over intelligent platform management interface (IPMI) interface;
   identifying a location of a peripheral device firmware image transmitted from the BMC to the firmware of the computing system using original equipment manufacturer (OEM) IPMI commands containing REST Hypertext Transfer Protocol (HTTP) requests;
   retrieving, by way of the firmware of the computing system, the peripheral device firmware image from the location of the peripheral device firmware image;
   executing a firmware shell utility in a shell environment provided by the firmware of the computing system; and
   updating, by way of the firmware shell utility, the firmware of the peripheral device using an updated peripheral device firmware.

2. The computer-implemented method of claim 1, wherein identifying the location of the peripheral device firmware image is responsive to receiving the request at the BMC.

3. The computer-implemented method of claim 1, wherein the peripheral device firmware image comprises a firmware script, the firmware shell utility, and the updated peripheral device firmware.

4. The computer-implemented method of claim 1, further comprising providing, by way of the firmware of the computing system, the shell environment, and executing the firmware shell utility in the shell environment.

5. The computer-implemented method of claim 1, wherein the peripheral device comprises a PCIe device.

6. The computer-implemented method of claim 1, wherein the peripheral device firmware image comprises a PCIe firmware.

7. The computer-implemented method of claim 1, wherein the BMC provides the peripheral device firmware image to the firmware update module.

8. The computer-implemented method of claim 1, wherein the computing system identifies the location of the peripheral device firmware image transmitted from the BMC to the firmware of the computing system by way of non-standard data stored in a standard property.

9. The computer-implemented method of claim 8, wherein the standard property comprises a property for identifying a location of a boot device.

10. The computer-implemented method of claim 1, wherein the computing system identifies the location of the peripheral device firmware image using a JavaScript Object Notation (JSON) format based on an Open Data Protocol (OData).

11. A non-transitory computer-readable storage medium having computer-executable instructions stored thereupon which, when executed by a computing system, cause the computing system to:
   transmit a request for a firmware update instruction for a peripheral device from a firmware of the computing system to a baseboard management controller (BMC) over a representational state transfer (REST) over intelligent platform management interface (IPMI) interface;
   identify a location of a peripheral device firmware image transmitted from the BMC to the firmware of the computing system using original equipment manufacturer (OEM) IPMI commands containing REST Hypertext Transfer Protocol (HTTP) requests;
   retrieve, by way of the firmware of the computing system, the peripheral device firmware image from the location of the peripheral device firmware image;
   execute a firmware shell utility in a shell environment provided by the firmware of the computing system; and
   update, by way of the firmware shell utility, the firmware of the peripheral device using an updated peripheral device firmware.

12. The non-transitory computer-readable storage medium of claim 11, having further instructions stored thereupon to identify the location of the peripheral device firmware image responsive to receiving the request at the BMC.

13. The non-transitory computer-readable storage medium of claim 11, wherein the peripheral device firmware image comprises a firmware script, the firmware shell utility, and the updated peripheral device firmware.

14. The non-transitory computer-readable storage medium of claim 11, having further instructions stored thereupon to provide, by way of the firmware of the computing system, the shell environment, and execute the firmware shell utility in the shell environment.

15. The non-transitory computer-readable storage medium of claim 11, wherein the peripheral device comprises a PCIe device.

16. The non-transitory computer-readable storage medium of claim 11, wherein the peripheral device firmware image comprises a PCIe firmware.

17. The non-transitory computer-readable storage medium of claim 11, having further instructions stored thereupon to cause the BMC to provide the peripheral device firmware image to the firmware update module.

18. The non-transitory computer-readable storage medium of claim 11, having further instructions stored thereupon to cause the computing system to identify the location of the peripheral device firmware image transmitted from the BMC to the firmware of the computing system by way of non-standard data stored in a standard property.

19. The non-transitory computer-readable storage medium of claim 18, wherein the standard property comprises a property for identifying a location of a boot device.

20. A computing system, comprising:
   one or more processors; and at least one non-transitory computer-readable storage medium having computer-executable instructions stored thereupon which, when executed by the one or more processors, cause the computing system to:

transmit a request for a firmware update instruction for a peripheral device from a firmware of the computing system to a baseboard management controller (BMC) over a representational state transfer (REST) over intelligent platform management interface (IPMI) interface;

identify a location of a peripheral device firmware image transmitted from the BMC to the firmware of the computing system using original equipment manufacturer (OEM) IPMI commands containing REST Hypertext Transfer Protocol (HTTP) requests;

retrieve, by way of the firmware of the computing system, the peripheral device firmware image from the location of the peripheral device firmware image;

execute a firmware shell utility in a shell environment provided by the firmware of the computing system; and update, by way of the firmware shell utility, the firmware of the peripheral device using an updated peripheral device firmware.

\* \* \* \* \*